(12) United States Patent
Miller et al.

(10) Patent No.: US 11,320,273 B2
(45) Date of Patent: May 3, 2022

(54) NAVIGABLE BOUNDARY GENERATION FOR AUTONOMOUS VEHICLES

(71) Applicant: DeepMap Inc., Palo Alto, CA (US)

(72) Inventors: Derek Thomas Miller, Palo Alto, CA (US); Lin Yang, San Carlos, CA (US); Mark Damon Wheeler, Saratoga, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 222 days.

(21) Appl. No.: 16/721,516

(22) Filed: Dec. 19, 2019

(65) Prior Publication Data

US 2020/0200547 A1 Jun. 25, 2020

Related U.S. Application Data

(60) Provisional application No. 62/782,331, filed on Dec. 19, 2018.

(51) Int. Cl.
| | |
|---|---|
| *G01C 21/32* | (2006.01) |
| *G05D 1/00* | (2006.01) |
| *G08G 1/0968* | (2006.01) |
| *G05D 1/02* | (2020.01) |
| *G08G 1/01* | (2006.01) |

(52) U.S. Cl.
CPC .......... *G01C 21/32* (2013.01); *G05D 1/0088* (2013.01); *G05D 1/0214* (2013.01); *G08G 1/096805* (2013.01); *G05D 2201/0213* (2013.01); *G08G 1/0129* (2013.01)

(58) Field of Classification Search
CPC .... G01C 21/32; G05D 1/0088; G05D 1/0214; G05D 2201/0213; G08G 1/096505; G08G 1/0129
USPC ........................................................ 701/450
See application file for complete search history.

(56) References Cited

U.S. PATENT DOCUMENTS

| | | | |
|---|---|---|---|
| 10,474,164 B2* | 11/2019 | Wheeler | G01C 21/3658 |
| 2014/0297116 A1* | 10/2014 | Anderson | B60G 13/14 |
| | | | 701/37 |
| 2016/0054135 A1* | 2/2016 | Fowe | G01C 21/30 |
| | | | 701/117 |
| 2017/0146360 A1* | 5/2017 | Averbuch | G01C 21/3679 |
| 2018/0188742 A1* | 7/2018 | Wheeler | G08G 1/0141 |

* cited by examiner

*Primary Examiner* — Mahmoud S Ismail
(74) *Attorney, Agent, or Firm* — Maschoff Brennan

(57) ABSTRACT

A system accesses a three-dimensional map of a geographic region and generates a two-dimensional projection of the road based on the three-dimensional map. The two-dimensional projection comprises a plurality of points along the road and each point is assigned a score measuring a navigability of the point. Based on the navigability score of each point and history of vehicle positions on the road, the system identifies a plurality of navigable points on the two-dimensional projection of the road. Based on the plurality of navigable points, the system determines a navigable surface corresponding to a physical area over which a vehicle may safely navigate and navigable surface boundaries surrounding that area. The navigable surface area and boundaries on the two-dimensional projection are converted into a three-dimensional representation, which the system uses to generate an updated three-dimensional map of the geographic region.

36 Claims, 20 Drawing Sheets

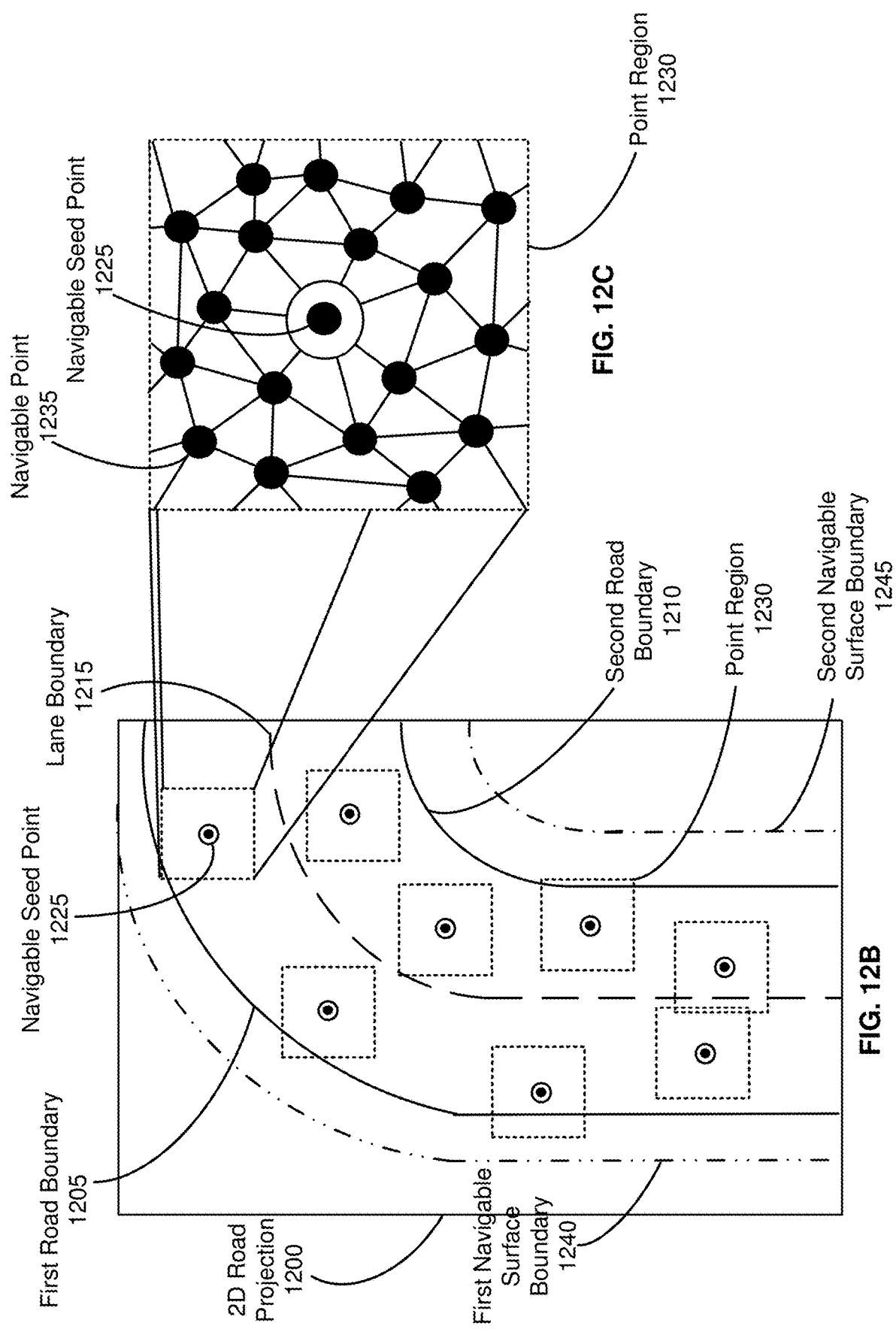

NAVIGABLE BOUNDARY GENERATION FOR AUTONOMOUS VEHICLES

CROSS REFERENCE TO RELATED APPLICATIONS

This application claims the benefit of priority under 35 USC 119(e) to U.S. Provisional Application No. 62/782,331 entitled "Navigable Boundary Generation for Autonomous Vehicles," filed on Dec. 19, 2018, which is incorporated herein by reference in its entirety for all purposes.

TECHNICAL FIELD

This disclosure concerns autonomous vehicles in general and more specifically to generating high-definition maps for navigation of autonomous vehicles.

BACKGROUND

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information with high confidence instead of relying on less-reliable sensor data. However conventional maps have several drawbacks that make them difficult to use for an autonomous vehicle. To be useful, the geometry of the map and the ability of the vehicle to determine its location in the map needs to be highly accurate (e.g., 10 cm or less). Conventional maps do not provide the level of accuracy required for safe navigation. GPS systems provide accuracies of approximately 3-5 meters, but have large error conditions resulting in an accuracy of over 100 m which occur frequently depending on environmental conditions. This makes it challenging to accurately determine the location of the vehicle with a conventional map and GPS.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

A system generates a high definition map for use by an autonomous vehicle to travel from a source address to a destination address using information from an online system. The system uses information collected by sensors to generate a high definition map of traffic lanes, as well as features relative to the lanes such as navigable surface boundaries for each lane. The system uses the detected information to generate a representation of a navigable surface boundary for a lane describing a physical area that lies beyond the boundary of a lane but within which the vehicle may safely navigate without damage to the vehicle (i.e., on a road shoulder). By analyzing the navigable surface boundary, the system may signal the controls of the autonomous vehicle to travel over the navigable surface in case of emergency situations, for example, if an unexpected obstruction is encountered in the lane that the autonomous vehicle is driving in, the vehicle may safely evade or navigate around the obstacle by moving within the navigable surface boundary of the lane.

In an embodiment, the system receives a three-dimensional, high definition map representation of a geographical region. Within each of the geographic regions, the system identifies lanes or roads over which vehicles have historically navigated, as well as one or more structures on or surrounding those roads. These structures represent potential obstructions such as fences, walls, trees, or buildings. The system generates a two-dimensional representation of the geographic region, which comprises a plurality of navigable points that a vehicle can safely navigate over and a plurality of non-navigable points that a vehicle cannot safely navigate over. The system determines a navigability score for each point, which contributes to the navigable or non-navigable classification. The system connects navigable points along the lanes, roads, and surrounding areas of the geographic region to generate a navigable surface and contours navigable surface boundaries around the generated surfaces. The system converts a three-dimensional representation of the navigable surface and navigable surface boundaries from the two-dimensional representations and updates the three-dimensional, high definition map with the navigable surfaces and navigable surface boundaries. A vehicle can use the navigable surface boundaries information in a map to safely navigate on a road. For example, a vehicle computing system sends control signals to the controls of the autonomous vehicle, causing the autonomous vehicle to navigate within the navigable surface boundaries.

BRIEF DESCRIPTION OF THE DRAWINGS

FIGS. 12B-12C are illustration of navigable seed points and navigable points on a two-dimensional projection of the road, according to an embodiment.

Figure 1:
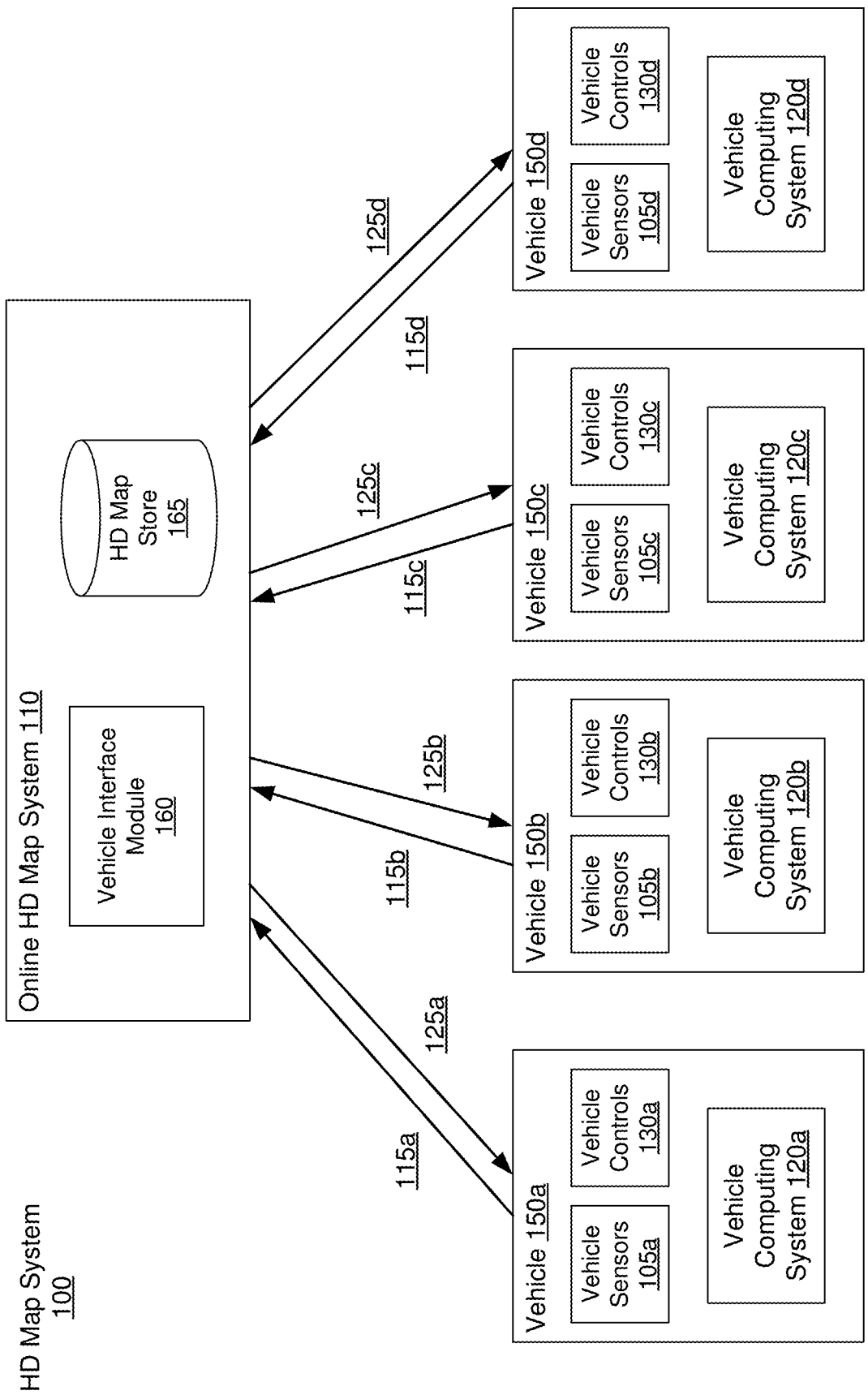
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without or with limited human input. Autonomous vehicles may also be referred to herein as "driverless car," "self-driving car," or "robotic car." High definition maps provide the high geometric accuracy plus additional information that allows the vehicle to identify its position in the map with similar accuracy. An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographical region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

General System Architecture

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
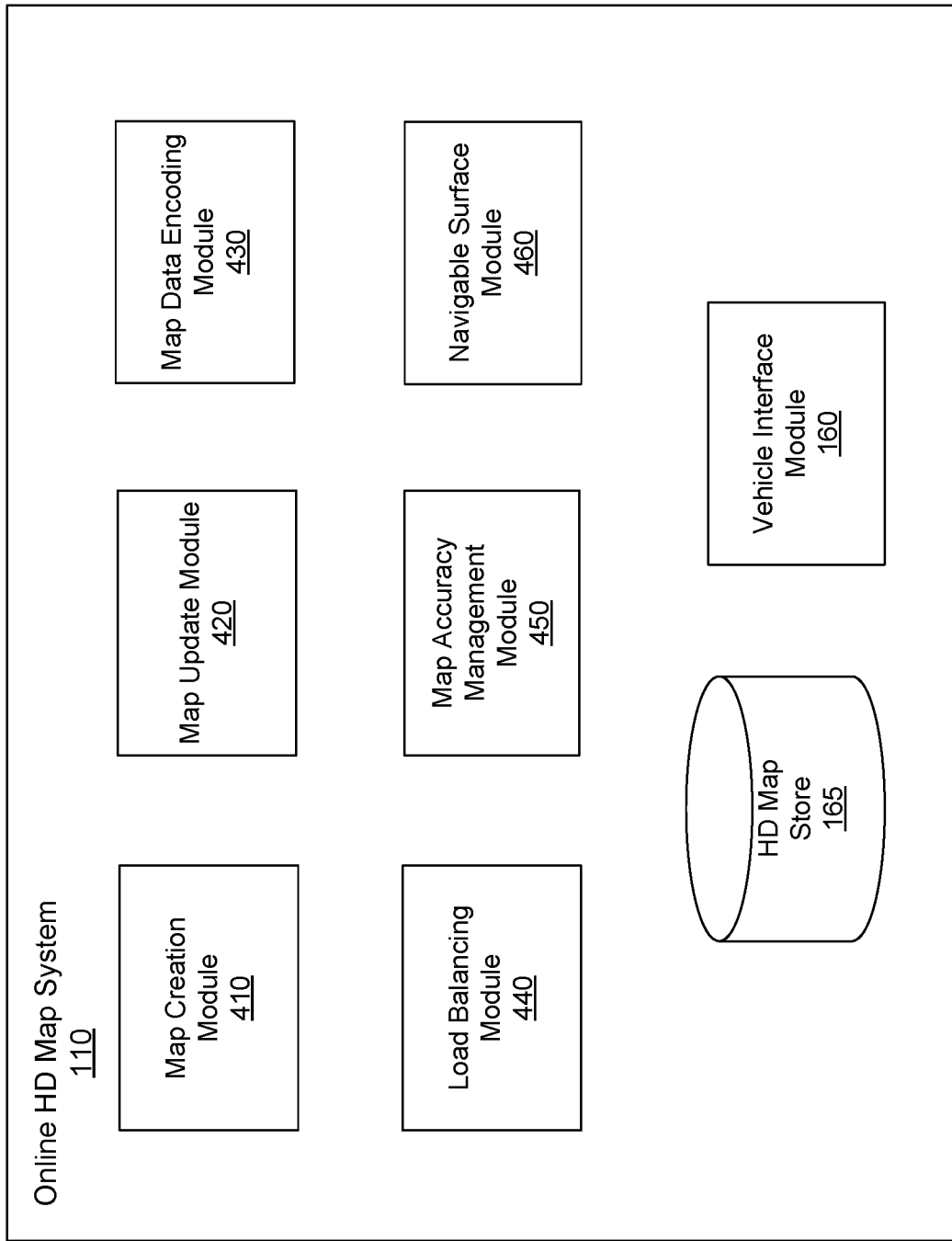
FIG. 4 shows the system architecture of an online HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
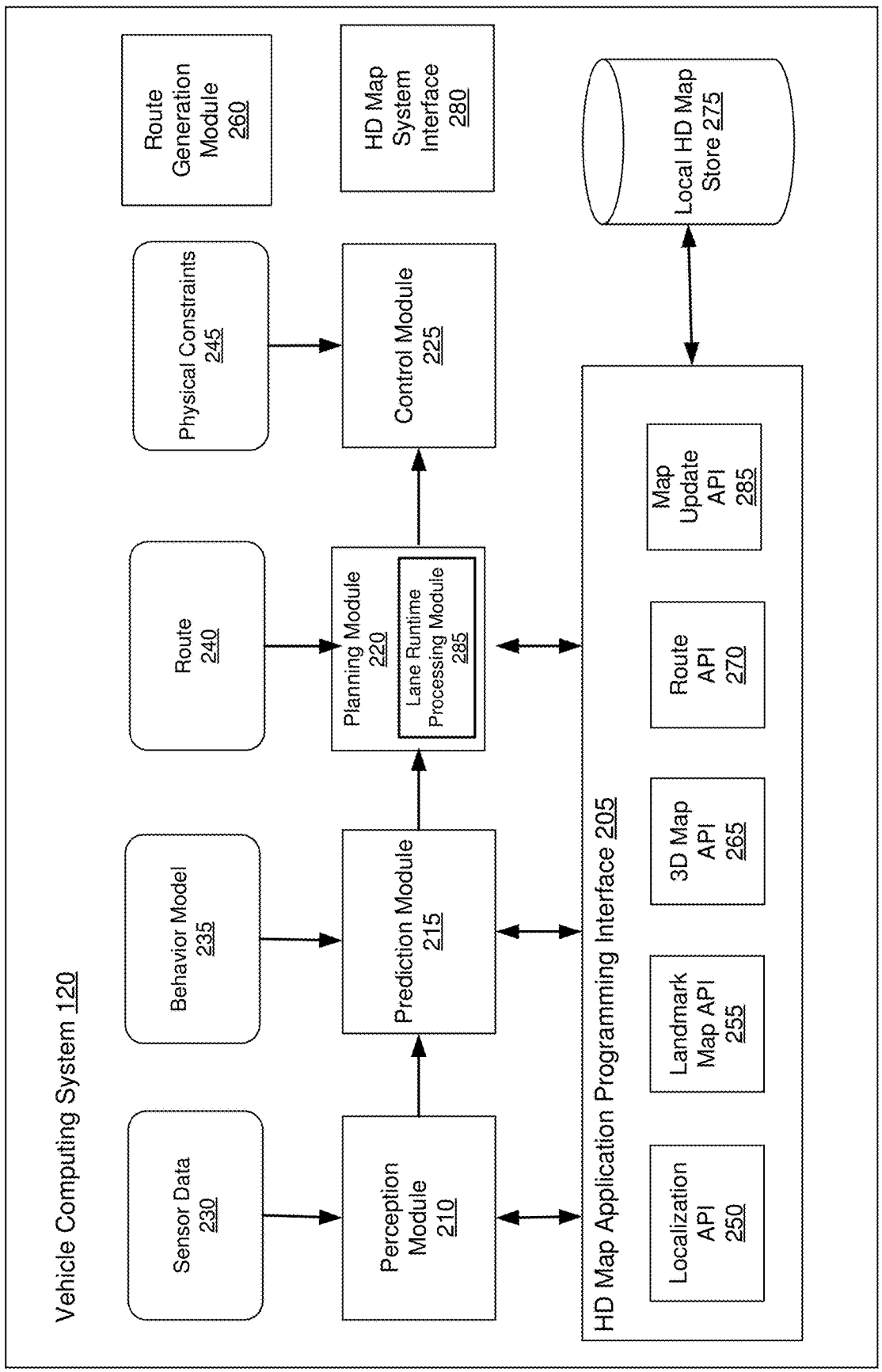
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a route generation module 260, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 220 to plan the subsequent actions that the vehicle needs to take next.

The planning module 220 receives the information describing the surroundings of the vehicle from the prediction module 215, the route 240 that determines the destination of the vehicle, and the path that the vehicle should take to get to the destination. The planning module 220 uses the information from the prediction module 215 and the route 240 to plan a sequence of actions that the vehicle needs to take within a short time interval, for example, within the next few seconds. In an embodiment, the planning module 220 specifies the sequence of actions as one or more points representing nearby locations that the vehicle needs to drive through next. The planning module 220 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on. To process real-time data from the surroundings of the vehicle, the planning module 220 further includes a lane runtime processing module 285 to determine whether the vehicle can safely cross lane boundaries and travel over surfaces outside of the lane boundaries. Navigating lane boundaries is further described below in reference to FIGS. 9A-B. In one embodiment, based on the surroundings of the autonomous vehicle, the prediction module 215 detects an emergency that would force the autonomous vehicle out of a lane and notifies the planning module 220 of the emergency. The lane runtime processing module determines that the vehicle can safely travel outside of the lane boundaries and signals to the control module 225.

The control module 225 determines the control signals for sending to the controls 130 of the vehicle based on the plan received from the planning module 220. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 265 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs 265 also include map update APIs 285, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 265 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its 14L value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The route generation module 260 computes and determines the optimal route traversing from a source address (or source location) to a destination address (or destination location). Details of the route generation module are shown in FIG. 15 described in relation with FIG. 16. Some functionality of the route generation module 260 may be performed in the online HD map system 110. Accordingly, the online HD map system 110 may store a corresponding route generation module 260 that interacts with the route generation module 260 stored in the vehicle computing system 120.

FIG. 4, described below, further illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
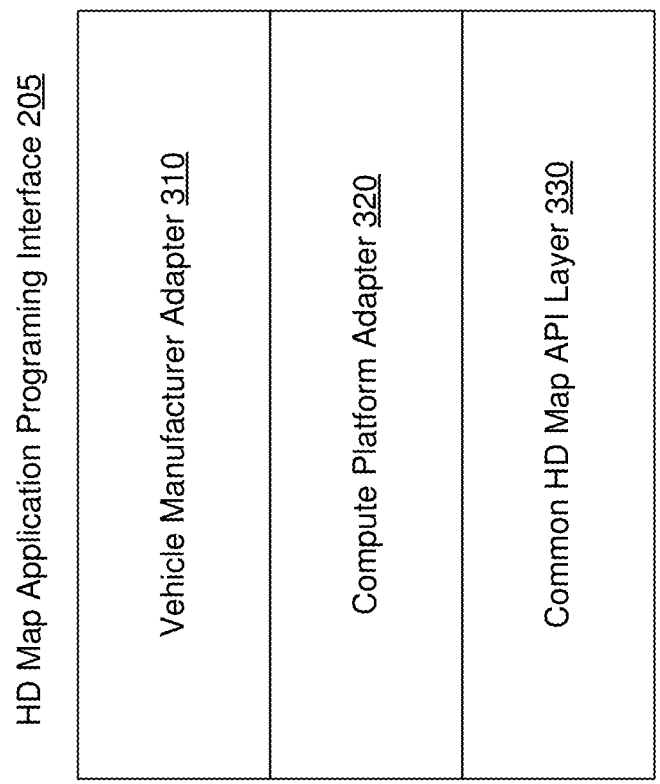
FIG. 3 illustrates the various layers of instructions in the HD Map API of a vehicle computing system, according to an embodiment.

As shown in FIG. 3, in an embodiment, the HD map API 205 is implemented as a library that includes a vehicle manufacturer adapter 310, a compute platform adapter 320, and a common HD map API layer 330. The common HD map API layer 330 comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module 450, a navigable surface module 460, a vehicle interface module 160, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
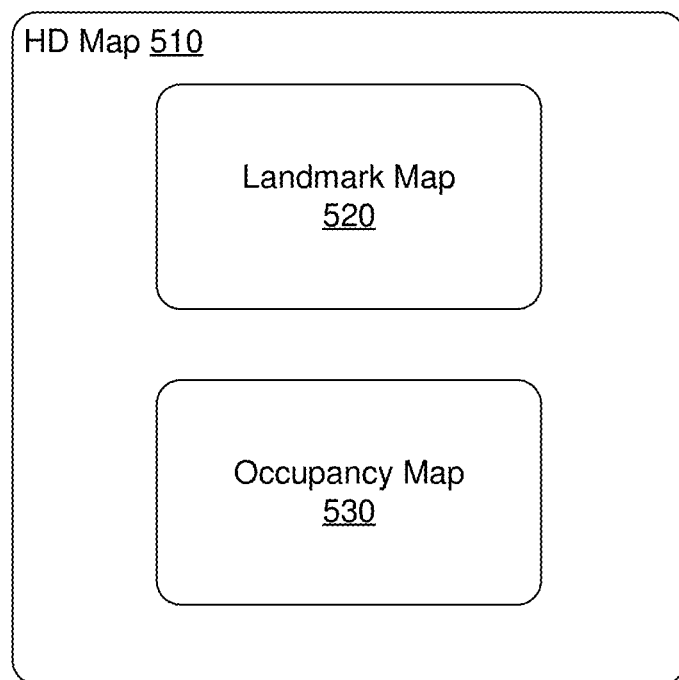
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying 4×1015 bytes or 4 petabytes. Therefore, the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a physical area into geographical regions and stores a separate representation of each geographical region. Each geographical region represents a continuous physical area bounded by a geometric shape, for example, a square, a rectangle, a quadrilateral or a general polygon. In an embodiment, the online HD map system 110 divides a physical area into geographical regions of the same size independent of the amount of data required to store the representation of each geographical region. In another embodiment, the online HD map system 110 divides a physical area into geographical regions of different sizes based on the amount of data required to represent the geographical region. Examples of data required to represent the region include but are not limited to a geometric area encompassed by the region, a concentration of traffic features in the region, or a population density in the region. As mentioned, in some embodiments, geographical regions are divided based on their concentrations of traffic features. For example, a physical area with a large number of traffic features may be divided into multiple geographical regions, whereas a physical area of the same size with fewer traffic features may be represented as a single geographical region. Traffic features include, but are not limited to, one or more traffic signs, one or more traffic lights, one or more driving lanes, and one or more changes in speed limit.

In some embodiments, a combination of traffic features may not only describe the concentration of features of the geographical region, but also the complexity of region. For example, a region containing multiple streets with, changes in speed limits may have fewer traffic features than a second region with the same amount of streets, but no changes in speed limits but more traffic lights. In this instance, the second street may be more concentrated, but the first street is more complex causing the region to be physically smaller than the second region. In some embodiments, the relative complexity ranking between features may differ between HD maps. Accordingly, in this embodiment, the online HD map system 110 determines the size of a geographical region based on an estimate of an amount of data required to store the various elements of the physical area relevant for the generation of an HD map.

In an embodiment, the online HD map system 110 represents a geographical region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
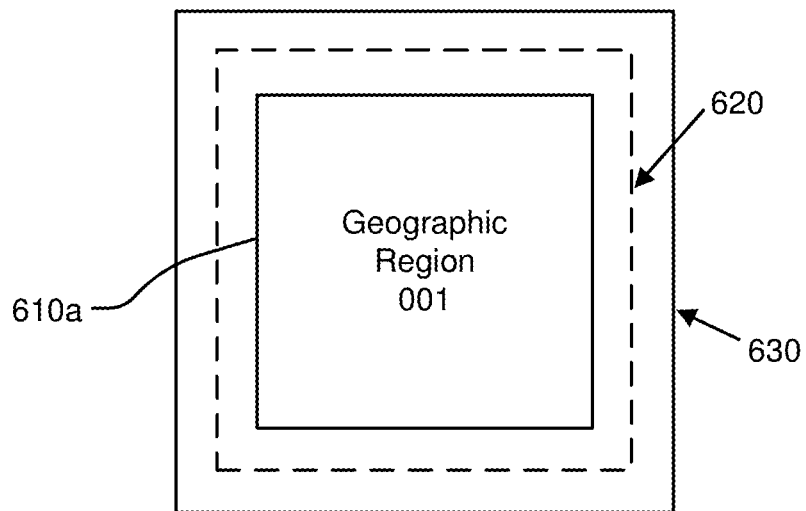
FIGS. 6A-B illustrate geographical regions defined in an HD map, according to an embodiment.
Figure 6B:
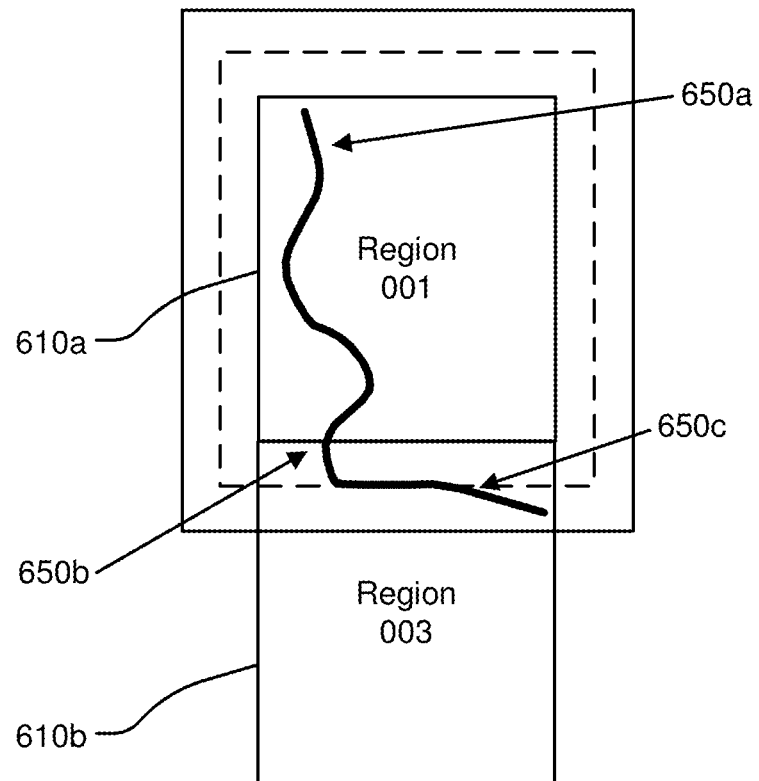

FIGS. 6A-B illustrate geographical regions defined in an HD map, according to an embodiment. FIG. 6A shows a square geographical region 610a. In other embodiments, the geographical regions may be divided into different shapes of tiles. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographical region has a buffer of a predetermined width around it. The buffer comprises redundant map data around all 4 sides of a geographical region (in the case that the geographical region is bounded by a rectangle). FIG. 6A shows a boundary 620 for a buffer of 50 meters around the geographical region 610a and a boundary 630 for buffer of 100 meters around the geographical region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it crosses the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
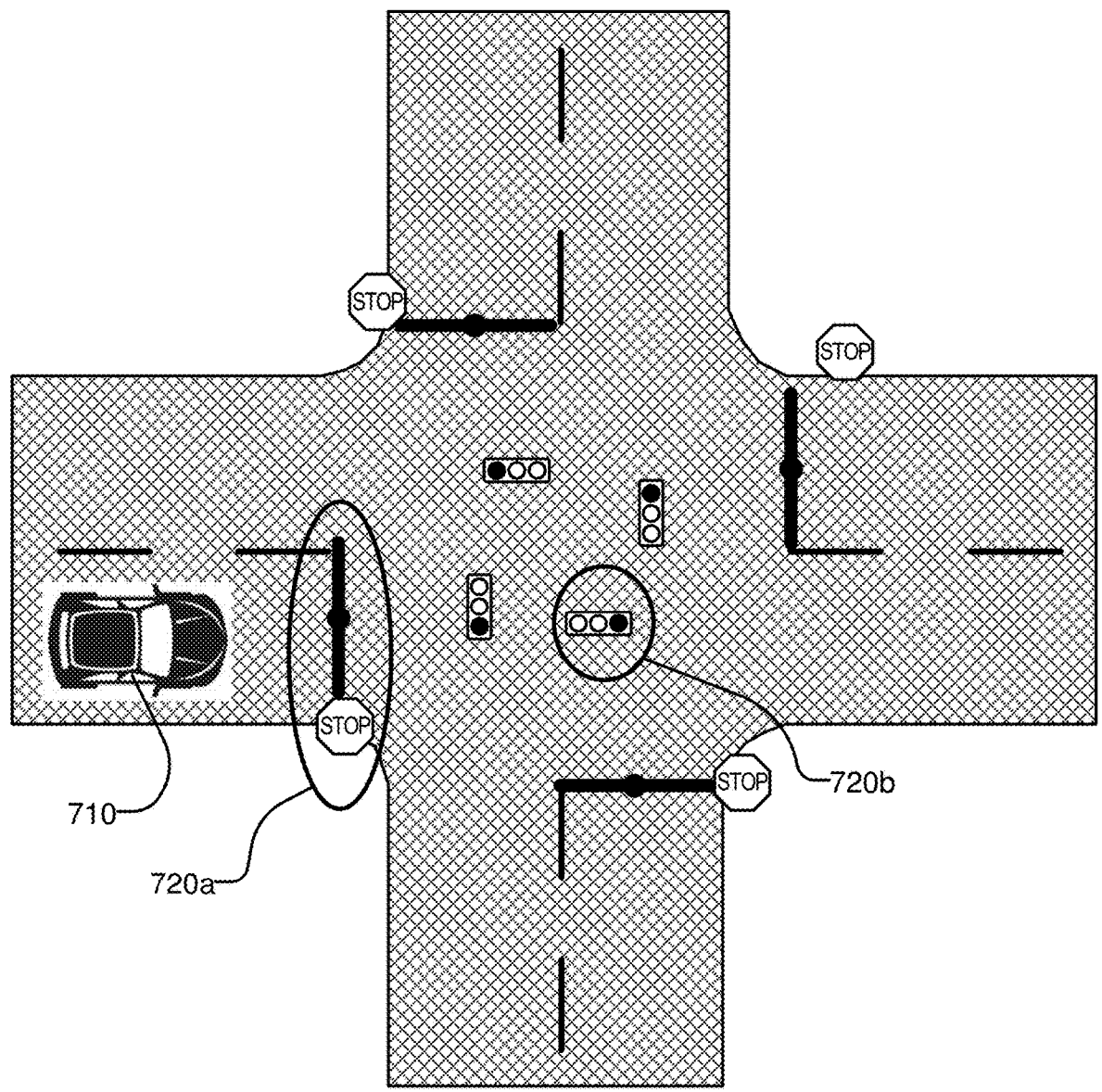
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

As described above lane elements are stored as pieces of an aggregated lane element graph. Within the lane element graph, individual lane elements are represented as nodes on the graph connected by edges to other nodes, representing neighboring lane elements of the graph. The edges connecting two lane elements indicate physical connection between two lane elements that a vehicle can legally traverse. For example, an edge between two lane elements may represent a dashed white line over which vehicles can change lanes, but may not represent a median over which vehicles not legally cross. In some embodiments, boundaries between lane lines over which cars cannot cross have a representation distinct from the above edges of the lane element graph. Additionally, within geographical regions, lane elements transition from a current lane element to one or more subsequent lane elements, and a lane element can be connected to multiple outgoing lane elements, for example at an intersection where a vehicle may turn left, turn right, or continue straight from their current lane (each of these are lane elements). Similarly, crossing the boundary of two geographical regions and transitioning from the current geographical region to an adjacent one, the lane element of the current geographical region also transitions to the connecting lane element with the adjacent geographical region.

Figure 8A:
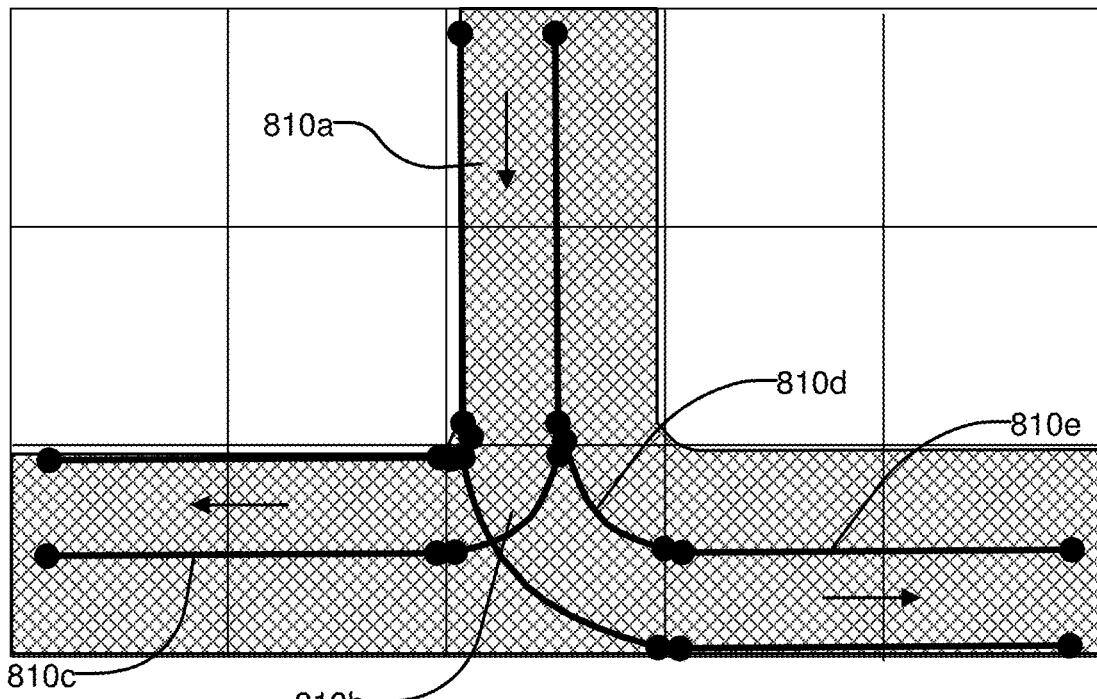
FIGS. 8A-B illustrate lane elements and relations between lane elements in an HD map, according to an embodiment.
Figure 8B:
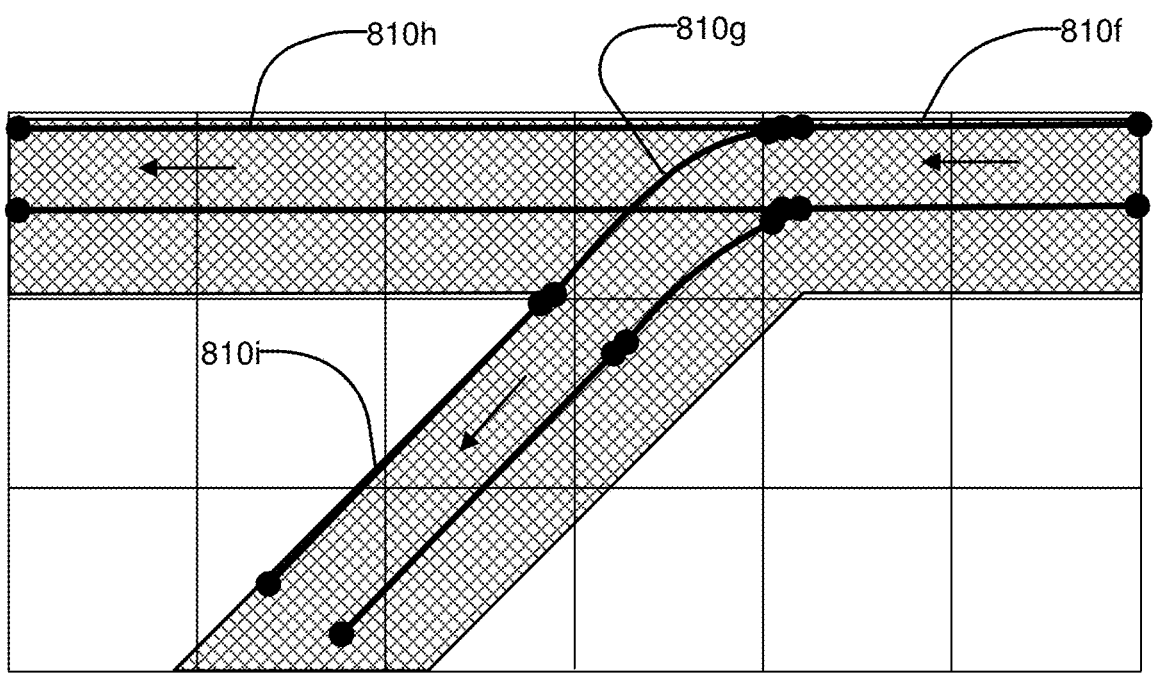

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Navigable Surface Boundary Implementation

Figure 9A:
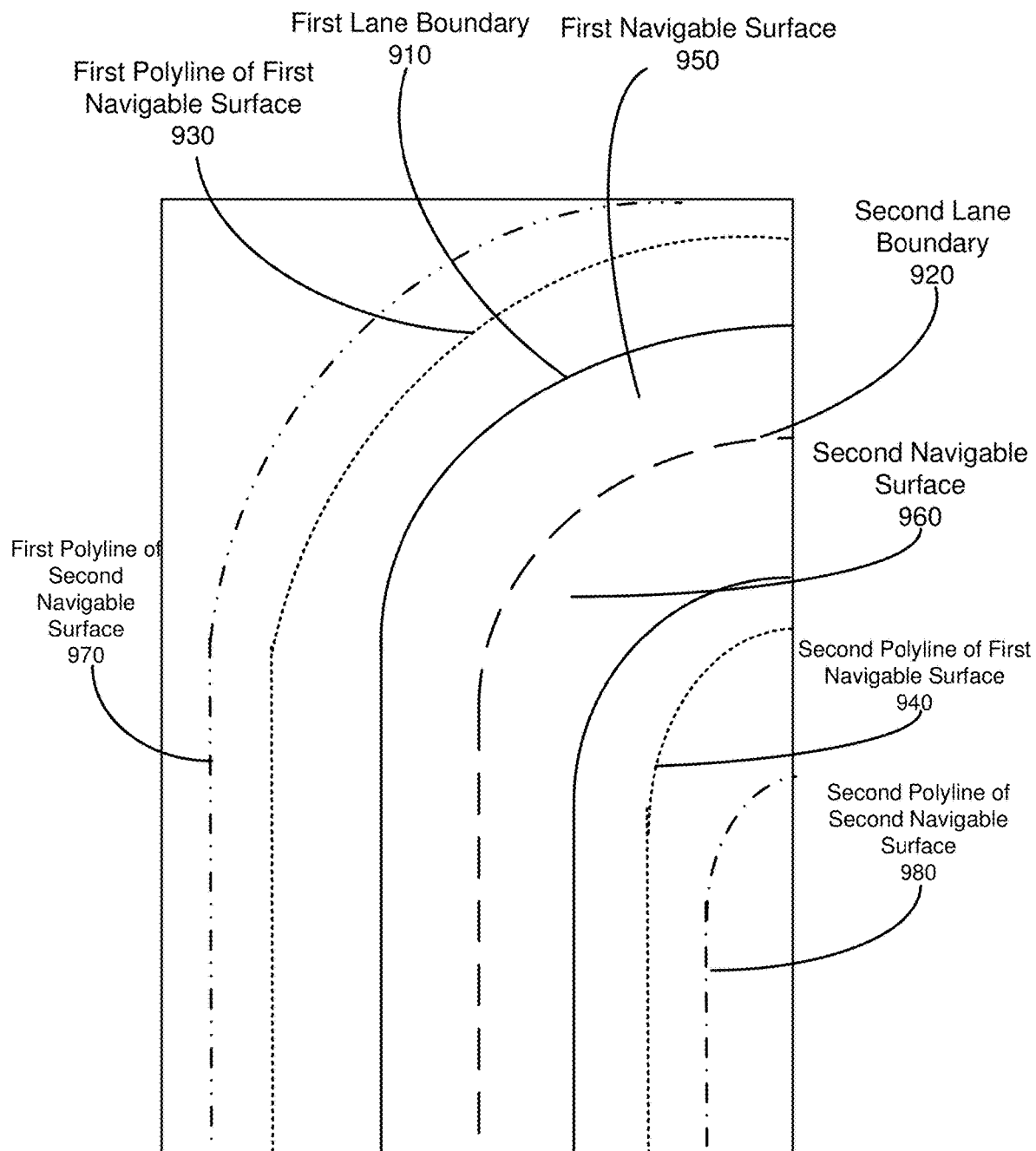
FIGS. 9A-B illustrate representations of navigable surface boundaries in an HD map, according to an embodiment.
Figure 9B:
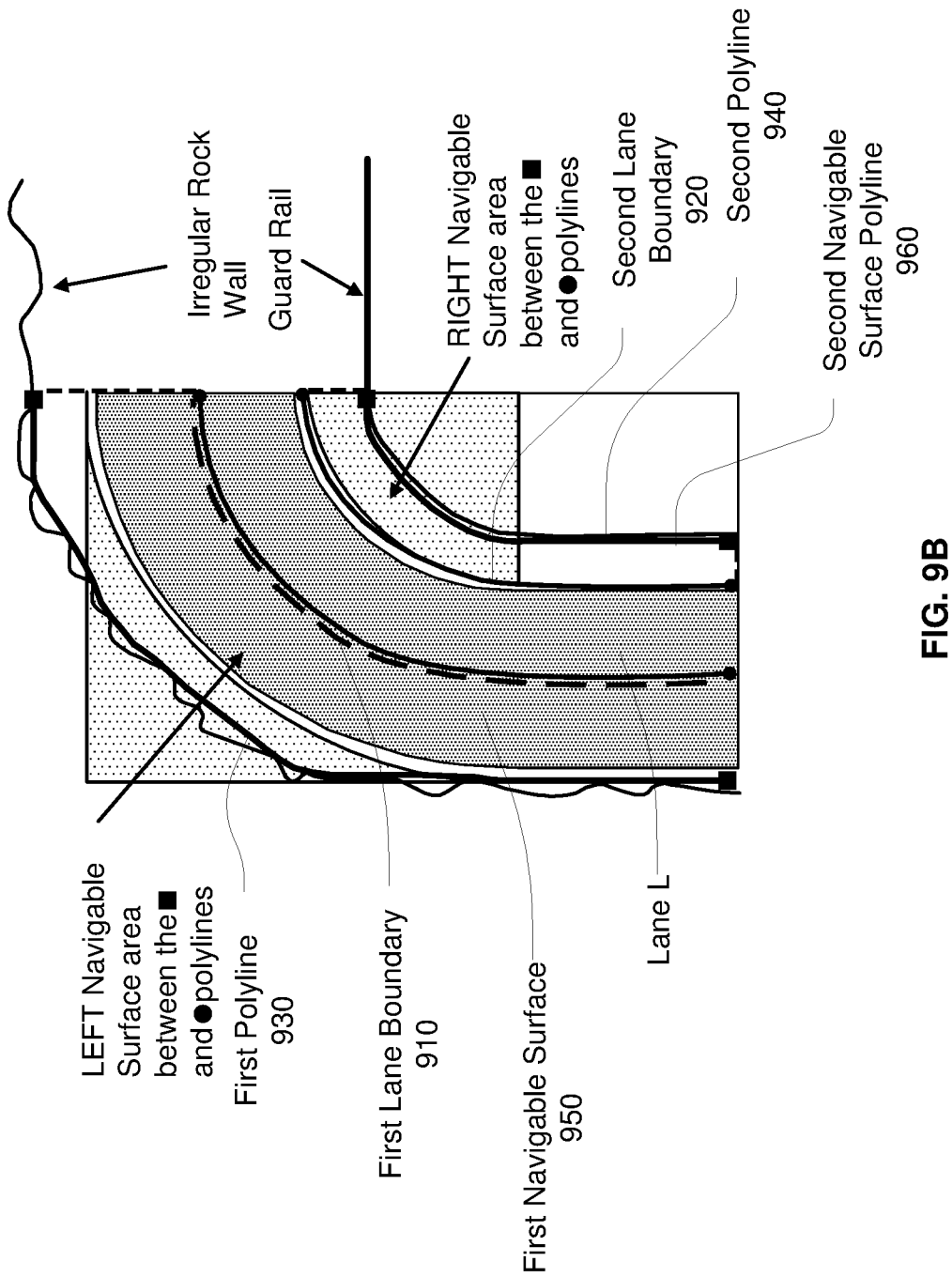

FIGS. 9A and 9B illustrate representations of lane boundaries and navigable surface areas in an HD map, according to an embodiment. For a vehicle to autonomously navigate through a road, lane, or other surface, the vehicle should be aware of areas where it can safely exit the road in the case of an emergency. Navigable surface boundaries describe a physical area that lies beyond the boundary of a road but within which the vehicle may safely navigate without damage to the vehicle. A vehicle can drive within the lane boundaries as well as the navigable surface outside the lane lines. A vehicle typically drives within lanes but in case of emergencies may drive on a navigable surface outside the lane lines. A given lane has two lane boundaries, a first lane boundary 910 and a second lane boundary 920. Beyond a lane boundary and outside the boundary of the road and within a polyline representation is an area of navigable surface. More specifically, between the first lane boundary 910 and the first polyline of first navigable surface 930 lies a first navigable surface 950 over which the autonomous vehicle can travel. Similarly, between the second lane boundary 920 and the second polyline of first navigable surface 940 lies a second navigable surface 960 over which the autonomous vehicle can travel outside the boundaries of the road. In some embodiments, a navigable surface area may refer to a shoulder on a road, a sidewalk adjacent to a lane, or a stretch of unpaved land adjacent to a road.

Figure 10:
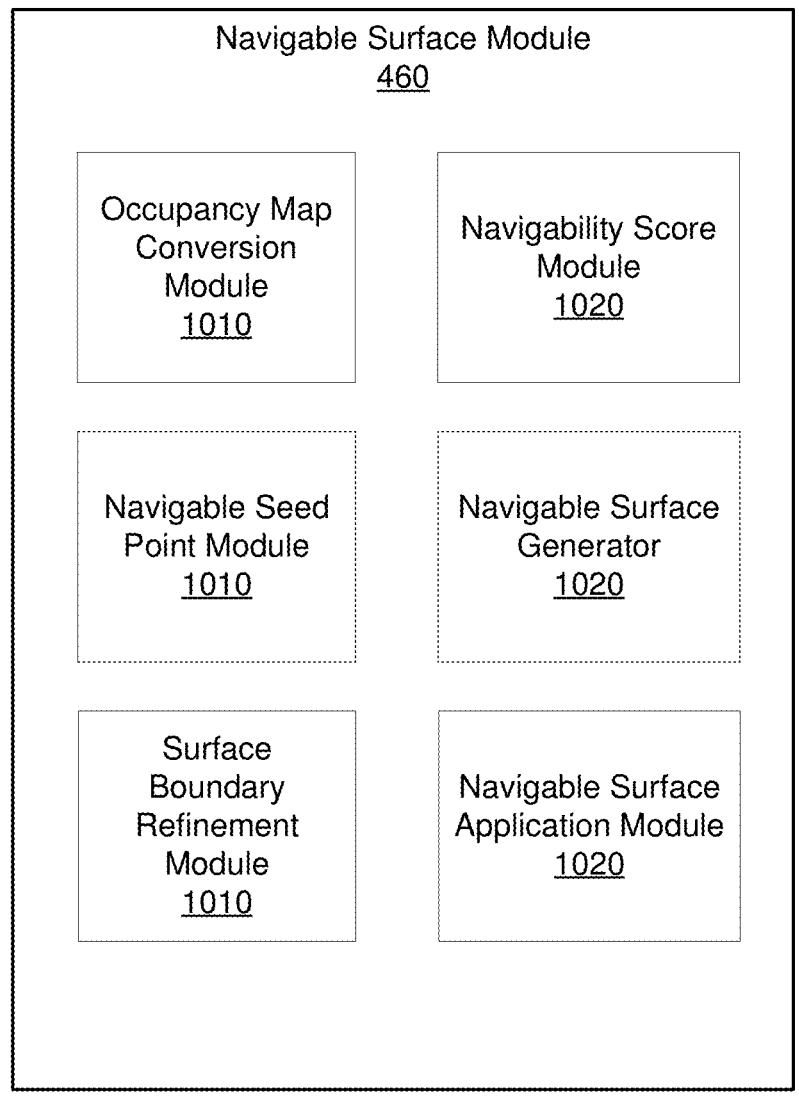
FIG. 10 illustrates a system architecture of the navigable surface module, according to an embodiment.

FIG. 10 illustrates the system architecture of navigable surface module 460, according to an embodiment. The navigable surface module 460 generates representations of navigable surfaces within an occupancy map. As described above, in one embodiment, an occupancy map (OMap) is a 3-dimensional (3D) representation of the road and all physical objects around the road. The data stored in an occupancy map 530 is referred to herein as occupancy grid data. Using a history of vehicle navigation over roads stored in the occupancy map, the navigable surface module 460 identifies navigable points on the roads and generates representations of navigable surfaces on the road or outside the road boundaries that are geometrically consistent with features of the occupancy map. The navigable surfaces may be bordered by navigable surface boundaries that represent demarcations between navigable surfaces, for example lanes or shoulders on a road, and non-navigable surfaces, for example ditches, guardrails, etc.

Accordingly, a navigable surface boundary demarcates a drivable surface from an undriveable surface that may cause damage to a vehicle if the vehicle were to drive outside the navigable surface boundary onto the undriveable surface. Examples of navigable surface boundaries include, but are not limited to, curbs, trees, ditches, guardrails, and medians. Navigable surface boundaries may also be defined around or in proximity to structures or obstacles detected on a road, for example fences, safety barriers, posts, walls, curbs, ditches or draining depressions, hills, buildings, and trees. In an embodiment, the system stores associations between different navigable surfaces and a level of difficulty of driving on the navigable surfaces. The level of difficulty of driving on a surface may be stored with the navigable surface or with a navigable surface boundary. For example, the system may store multiple navigable boundaries on each side of the road. Each navigable surface boundary is associated with a level of difficulty of driving on a navigable surface within the navigable surface boundary and adjacent to the navigable surface boundary. In an embodiment, a navigable surface that is within two navigable surface boundaries having two different values of levels of difficulty is assigned the higher value of the level of difficulty. In another embodiment, a navigable surface that is within two navigable surface boundaries having two different values of levels of difficulty is assigned the level of difficulty of the outer navigable surface boundary. The lanes of the road have a navigable surface boundary indicating the lowest level of difficulty. In an embodiment, if there are multiple navigable boundaries surrounding an area, successive boundaries form a region that is superset of a region formed by an inner navigable surface boundary.

In an embodiment, the levels of difficulty form a sequence of values, such that each successive level indicates a higher level of difficulty. Accordingly, a level indicating a higher level of difficulty is likely to cause higher damage to a vehicle if the vehicle is driven on that navigable surface. Similarly, a level indicating a higher level of difficulty is likely to cause more injury to a person in the vehicle if the vehicle is driven on that navigable surface. In an embodiment, the system determines a navigable surface for the lowest level of difficulty and successively determines navigable surfaces of increasing levels of difficulty. Accordingly, each new navigable surface determined for a particular level of difficulty is a superset of the navigable surfaces of lesser difficulty previously determined.

In an embodiment, the vehicle computing system executes a decision engine to determine what action to take in view of various options presented with varying levels of difficulty while driving on a road. For example, an obstruction such as debris on the road may present a level of difficulty. The vehicle determines whether to avoid the obstruction by swerving to the left or right. Each direction may present different levels of difficulty. For example an option considered by the vehicle may be changing lanes. In this situation, the vehicle computing system determines a measure of difficulty based on the traffic encountered in the lane if the vehicle changed lane. Another option that the vehicle may consider if driving off the road to a navigable surface that is outside the road boundary. The vehicle computing system determines the level of difficulty based on the navigable score of a navigable surface if the vehicle drove off the road. The vehicle computing engine may select the path that provides the smallest measure of difficulty. In an embodiment, the vehicle computing system determines various constraints based on the surroundings of the vehicles, different levels of difficulty, and determines a solution that satisfies the various constraints. The vehicle computing system may solve the constraints using an artificial intelligence based constraint satisfaction techniques.

In an exemplary implementation in which a vehicle may not safely navigate outside of a single lane road, navigable surface boundaries would be generated on both edges of the lane, or alternatively the road. Within the navigable surface boundaries, the surface of the lane would be labeled as a navigable surface boundary, whereas any surface beyond the boundaries would be labeled as a non-navigable surface. For the sake of simplicity, techniques and methods for generating navigable surface boundaries are described herein with reference to OMaps comprising a single navigable surface. However, one of skill in the art would recognize that the same techniques could be applied to more complex OMaps comprising multiple navigable surfaces.

The system architecture of the navigable surface module 460 comprises an occupancy map conversion module 1010, a navigability score module 1020, a navigable seed point module 1030, a navigable surface generator 1040, a surface boundary refinement module 1050, and a navigable surface application module 1060. In other embodiments, the navigable surface module 460 may include more or fewer modules. Functionality indicated as being performed by a particular module may be performed by other modules instead.

As described herein, an OMap comprises a three-dimensional representation of a geographical region, for example a portion of a road and the environment surrounding the portion of the road. The OMap represents a point cloud generated by combining data collected by sensors of multiple vehicles driving along the same region. The OMap may combine data collected by sensors of vehicles driving along different paths in the region. The techniques described herein may also be applied to point clouds of a geographic region generated using alternate techniques, for example a LIDAR scan. In one implementation, the occupancy map has an average of 20 cm error when matching centerlines of lanes and other structures in the occupancy map to their ground truth. The implementation of an OMap to determine navigable surface boundaries enables the HD Map system 100 to use the densest available data and to be more algorithmically efficient, rather than processing individual tracks as the runtime will be dependent on total map area and not miles tracked.

The OMap conversion module 1010 receives an OMap that includes a three-dimensional representation of a road traveling through a geographic region and one or more structures on or surrounding the road and converts the three-dimensional OMap into a two-dimensional projection of the road. In one implementation, the OMap conversion module 1010 generates a two-dimensional rasterization, for example through discretization, of the OMap. For each voxel of the three-dimensional OMap, the two-dimensional representation includes points along the road and structures on and surrounding the road.

The OMap conversion module 1010 may account for the possibility that objects, for example other vehicles, are moving across surfaces in the three-dimensional OMap during the determination of navigable surface boundaries for the road. Such a possibility may be, at least in part, a consideration in the decision of the navigable surface module 460 to generate a navigable surface boundary for a road before or after a car exits the road. Accordingly, in some implementations, the OMap conversion module 1010 uses ray tracing techniques to remove the majority of moving objects from the surface, such that remaining points represent stationary features or structures without changing the results of the analysis.

The generated two-dimensional representation of the road may resemble a projection of the OMap from a top-down perspective. The OMap conversion module 1010 identifies any points located at a depth below the surface of the ground by comparing depth values for each point to a minimum ground depth (i.e., surface level). The OMap conversion module 1010 removes any points below the ground depth and determines a navigability score for any remaining points that describes a measured depth or elevation of structures within the corresponding voxel of the OMap. The navigability score assigned to a point in the two-dimensional representation is, at least in part, determined based on the navigability of surfaces or features at the point. For example, if a point is part of a guardrail or a curb that is too high for a vehicle to navigate over, the navigability score assigned to the point may indicate that a vehicle cannot navigate over the point. In one embodiment, points may be assigned a range of navigability scores such that higher scores indicate lower levels of navigability. In other embodiments, navigability scores and levels of navigability are directly proportional. In some embodiments, the navigability scores are assigned for each OMap voxel or each OMap point.

The navigability score module 1020 may determine a navigability score based on the difference between a normal vector at a particular point and a local ground normal that may represent an aggregate normal across a surrounding ground surface, for example, within a boundary surrounding the point at a threshold distance. In one implementation, for each point P, the normal vector is calculated using plane fitting techniques, for example random sample consensus techniques, or principle component analysis of all points within a threshold distance R of the point P.

In addition, the navigability score module may determine the normal vector for a point using any other suitable techniques or analyses. Given the normal vector, the navigability score module 1020 determines a navigability score for the point as the angular deviation θ. In one embodiment, the navigability score module 1020 determines the angular deviation θ using Equation (1) described below:

$$\theta = \cos^{-1}(N_P \cdot z) \quad (1)$$

Where Np is the normal vector at point P and z is the local ground normal vector. In some embodiments, to determine the depth vector z, the navigability score module 1020 determines an average of the nearest OMap ground normals. In an embodiment, the system uses a small local neighborhood to determine the point normal Np at the point and a larger neighborhood area for determining the local ground normal z.

The threshold distance R used for calculation of a point normal may be determined with consideration to the size of the overall local ground normal computations. The size of the area used to compute the ground normal is larger than the size of the area used to compute the point normal. The size of a computation may characterize the time required for the computation, the processing capacity required for the computation, or a combination thereof. For smaller computations, the determined threshold distance R may be associated with greater noise. Accordingly, the navigability score module 1020 may determine a value of R based on the noise associated with the OMap geometry. For example, in OMaps with a perfect geometry, a normal vector for point P may be determined based on points immediately neighboring the point P. Alternatively, the navigability score module 1020 may determine a range of threshold distances by averaging the normal vector for a point over a range of values.

In one implementation, the OMap conversion module 1010 identifies one or more local sectors in the three-dimensional OMap. Each local sector is formatted into two-dimensional grid including multiple cells with several points representing positions on the two-dimensional projection. For each cell, the OMap conversion module 1010 selects a point with a minimum depth value and identifies any neighboring points within a radius R of the selected point. The OMap conversion module 1010 computes a normal vector for the selected point as an eigenvector of the neighboring points.

The navigability seed point module 1030 narrows the points along the two-dimensional projection of a road to a subset of navigable points, hereafter referred to as navigable seed points, using the navigability scores determined by the navigability score module 1020, a history of vehicle positions on the road, or a combination thereof. As described herein, navigable seed points describe a subset of points that the navigable surface module 460 can assert with high confidence, represent navigable positions on the road. In some implementations, the navigability seed point module 1030 compares navigability scores for all points on the projection to a threshold and identifies points with above threshold scores as navigable seed points. In other embodiments, the navigability seed point module 1030 may identify navigable seed points by referencing a history of vehicle positions on the road to determine where a single vehicle or a fleet of vehicles have safely driven on the road. In such embodiments, navigable seed points are identified at positions where a vehicle has driven by aligning a history of vehicle positions with positions on the two-dimensional projection of the road. As an example, a navigable seed point may be identified by determining a centroid of a vehicle's position. Alternatively, the navigability seed point module 1030 may implement the history of vehicle positions to identify one or more candidate navigable seed points from positions on the road and confirm navigable seed points from the candidates using a threshold navigability score.

The navigable surface generator 1040 expands a representation of navigable surface on the road by connecting neighboring navigable points until the entire area of the navigable surface is overlaid with connected navigable points. Because the navigable seed points identified by the navigable seed point module 1030 represent points on the road that the navigable surface module 460 can represent with high confidence, navigable surfaces, the navigable surface generator 1040 begins to expand the navigable surface from each navigable seed point. In an embodiment, the system uses vehicle positions as navigable seed points since the vehicle as known to have driven over that point. The system performs 2D region growing and any point not reachable from the seed point may be assumed to be non-navigable. In one embodiment, the navigable surface generator 1040 defines points regions surrounding each navigable seed point and searches the defined point region for any neighboring navigable points. Accordingly, the navigable surface generator 1040 classifies neighboring points within the point region as navigable or non-navigable. For example, neighboring navigable points may include points with an above threshold navigability score that had not been traversed during the history of vehicle positions or points that had been traversed during the history of vehicle positions with a below threshold navigability score. In comparison, non-navigable neighboring points may include points with a below threshold navigability score that were not traversed during the history of vehicle of positions.

Regions that are not reachable from seeds are assumed to be not navigable, for example, a pole or a hole in the ground. FIG. 12H and FIG. 12G illustrate the situation when a pole 1275 is present in the area being processed for determination of navigable surfaces. In an embodiment, the system draws a boundary 1260 around the pole as shown in FIG. 12F. This navigable surface boundary 1265 is not connected to the navigable surface boundary 1260. In another embodiment, the system generates a continuous navigable surface boundary 1280 that avoids the pole 1275. The embodiments illustrated in FIGS. 12G and 12H are applicable in the situation when the pole is replaced by a hole representing missing information in the HD map. Accordingly, a hole represents an area in which the navigability scores could not be computed for any reason, for example, due to missing data in the HD map or because the navigability scores were bad, indicating that the surface for that specific area is not navigable.

For each navigable point identified within a point region of a navigable seed point, the navigable surface generator 1040 repeats the steps described above to iteratively identify any neighboring navigable points until all points in the two-dimensional projection have been labeled as navigable or non-navigable and, as a result, all navigable space in the projection has been labeled. At areas on the two-dimensional projections where an area of navigable space is bordered by an area of non-navigable space, the navigable surface generator 1040 generates a closed contour to define the navigable surface boundary. The navigable surface boundary may be defined based on a measure of preciseness by which an edge may be defined at that point.

In one implementation, the navigable surface generator 1040 expands a navigable surface area by connecting neighboring navigable points to a navigable seed point to form a multi-dimensional array using floodfill techniques. An example floodfill technique determines all adjacent points that meet certain criteria by starting with a seed (representing a point known to satisfy the criteria), and, recursively, adds more and more points as seeds around the original seed if these points are determined to satisfy the criteria as well.

When implementing floodfill techniques, the navigable surface generator 1040 considers at least three parameters: a starting node (i.e., a navigable seed point), and target label, and a replacement label. A label indicates a level of difficulty of navigating over the area represented by a voxel. The navigable surface generator 1040 identifies all neighboring points connected to each navigable seed point with a path of a target label and changes the connecting paths to the replacement label. In some implementations, the navigable surface generator uses a queue, a stack data structure, or some other mechanism to organize navigable seed points to be processed.

The navigable surface generator 1040 iteratively (or recursively) applies the floodfill techniques described above to navigable seed points, until the only remaining neighboring points are points with navigability scores below a threshold value. When only non-navigable neighboring points remain, the navigable surface generator 1040 stops the generation of the navigable surface and, instead, generates a navigable surface boundary to separate the remaining non-navigable points and the navigable surface.

Using the closed contour generated by the navigable surface generator, the surface boundary refinement module 1050 identifies opening or exits into the navigable space that are too small for a vehicle to enter or exit through, for example pedestrian walkways. The surface boundary refinement module 1050 classifies each identified opening or exit as a non-navigable space and updates the generated contour to traverse through the identified opening or exit. As a result, access to openings or exits that are too small for a vehicle to pass is closed off by the navigable surface boundary. In some implementations, a vehicle's ability to access an opening or exit is determined on a vehicle-type basis. For example, a delivery robot may be capable of entering a sidewalk from a pedestrian walkway, whereas a sedan cannot. The surface boundary refinement module 1050 may assess height requirements for a vehicle to access an opening or an exit. For example, low hanging objects suspended over a navigable surface that may obstruct taller vehicles from navigating through the surface. In such instances, the height may be encoded into individual lane elements without constraining the navigable surface boundary.

In other embodiments, the surface boundary refinement module 1050 applies filtering techniques including, but not limited to, a median or a combination of dilation and erosion, to close such small areas. The applied filter may be designed using a predetermined noise tolerance to prevent the removal of certain navigable boundaries, for example a boundary created by a thin pole.

After applying one or more of the described refinement techniques to complete the navigable surface and the navigable surface boundaries generated by the navigable surface generator 1040, the contour defining the navigable surface boundary may be converted into a set of navigable boundary elements composed of latitude, longitude, and altitude points. Based on the latitude, longitude, and altitude points on the navigable surface boundary, the navigable surface application module 1060 maps each point on the navigable surface boundary in the two-dimensional projection of a region to a node in the three-dimensional occupancy map. By mapping each two-dimensional point along the navigable surface boundary to a node in the OMap, the navigable surface application module 1060 generates a three-dimensional representation of the navigable surface. Additionally, the navigable surface application module 1060 may connect a three-dimensional node of the OMap mapped to a two-dimensional point on the navigable surface boundary to any neighboring, similarly mapped three-dimensional nodes to generate the three-dimensional representation of the navigable surface boundary.

In some implementations, the navigable surface application module 1060 assigns the navigability score determined for each point on the navigable surface boundary to a corresponding three-dimensional node. When generating the three-dimensional representation of the navigable surface boundary from a first node, the navigable surface application module 1060 compares the navigability scores of any neighboring three-dimensional nodes to a threshold before connecting the nodes to form a section of the navigable surface.

The navigable surface application module 1060 overlays the generated three-dimensional representation of the navigable surface boundary with an OMap for a geographic region to generate an updated OMap for the occupancy map. The navigable surface application module 1060 provides an updated OMap for a geographic region to an autonomous vehicle driving through the region such that the vehicle can drive over the navigable surfaces and remain within the navigable surface boundaries.

In some embodiments, the navigable surface module 460 may classify navigable surface boundaries with varying levels of confidence, for example navigable surface boundaries of varying risk levels. The varying levels of navigability may also be defined based on certain conditions or features detected on a road. For example, a curb may be defined as a navigable surface boundary, but to avoid a pedestrian crossing a road, a vehicle may be instructed to navigate over the curb. Similarly, a navigable surface module 460 may classify a bush as a lower risk navigable surface boundary compared to a tree because a bush may cause more minor damage compared to the tree. The navigable surface module may further define the navigability of the based on a type of vehicle, for example emergency vehicles, all-terrain vehicles, or delivery robots. In some embodiments, the navigability of a surface may be determined based on a current position of a vehicle. For example, a road on the other side of a median may be drivable, but if a vehicle cannot safely cross the median or reach the other side, the road is functionally undriveable and the navigable surface module 460 may label the surface accordingly. Alternatively, if the vehicle makes a turn or anticipating making a turn to safely enter the road on the other side, the navigable surface module 460 may dynamically update the label of the surface to navigable. Accordingly, the navigable surface module 460 dynamically generates navigable surface boundaries based on where a vehicle may travel from where the vehicle is currently located.

Additional techniques regarding the generation of navigable surface boundaries for the navigation of autonomous vehicles can be found in U.S. Pat. No. 10,474,164, filed Dec. 22, 2017 and issued on Nov. 12, 2019, which is incorporated herein by reference in its entirety for all purposes.

Figure 11:
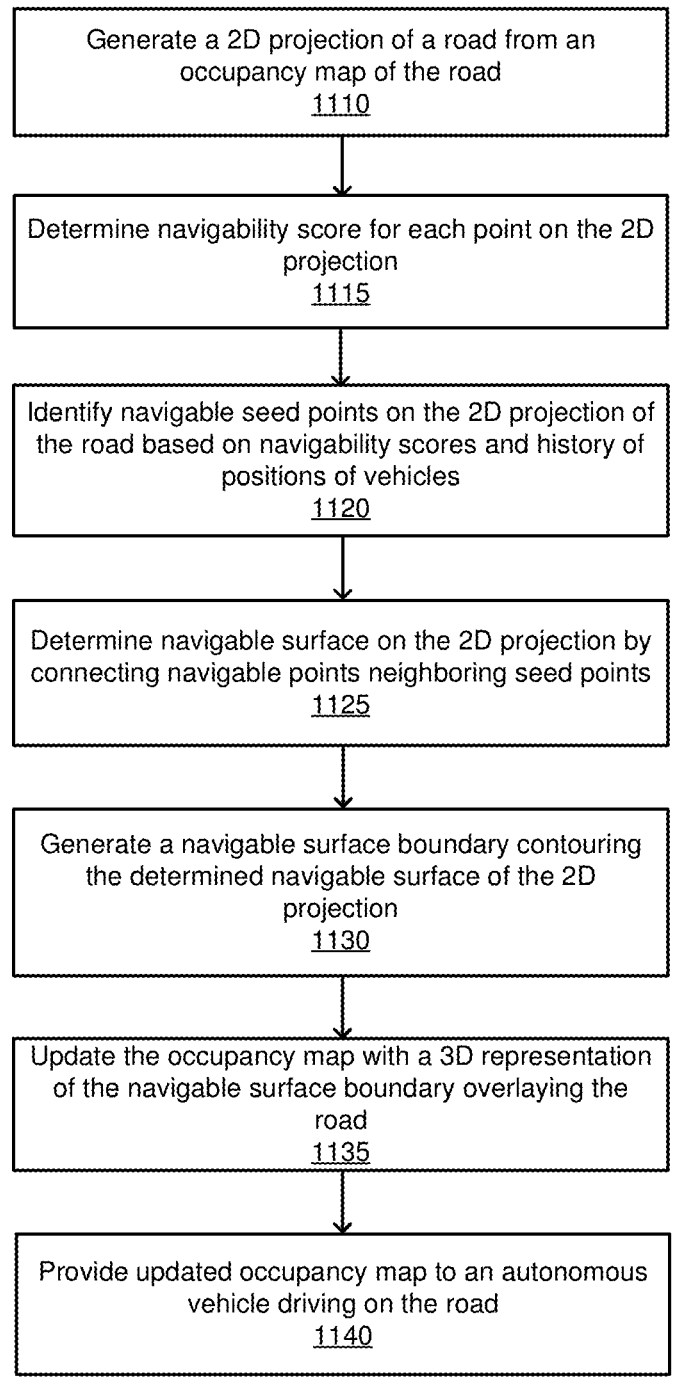
FIG. 11 illustrates a flow chart of the overall process for generating a navigable surface and navigable surface boundaries for a road, according to an embodiment.

FIG. 11 illustrates a flow chart of the overall process for generating a navigable surface and navigable surface boundaries for a road, according to an embodiment. The navigable surface module 460 generates 1110 a two-dimensional projection of a road from an occupancy map of the road. For each point on the two-dimensional projection, the navigable surface module 460 determines 1115 a navigability score. Based on the determined navigability scores and a history of positions of vehicles traveling over the road, the navigable surface module 460 identifies 1120 navigable seed points on the two-dimensional projection of the road. The navigable surface module 460 determines 1125 a navigable surface on the two-dimensional projection by connecting neighboring navigable points to a navigable seed point and generating 1130 a navigable surface boundary contouring the determined navigable surface of the two-dimensional projection. The navigable surface module 460 updates 1135 the received occupancy map with a three-dimensional representation of the generated navigable surface and navigable surface boundaries and provides 1140 the updated occupancy map to an autonomous vehicle driving through the region of the occupancy map.

Figure 12A:
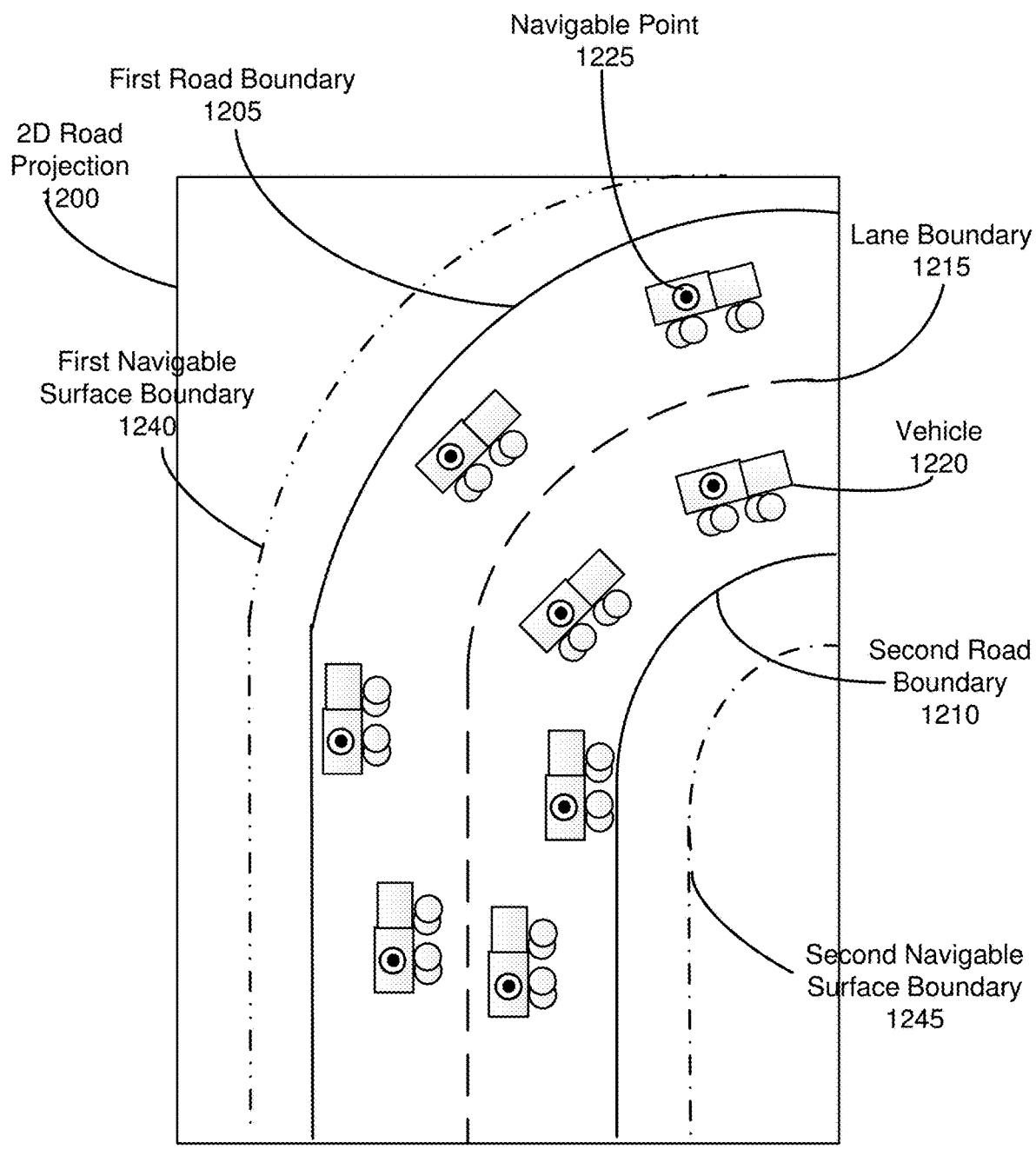
FIG. 12A is an illustration of a two-dimensional projection of a road with positions of a plurality of vehicles, according to an embodiment.

FIG. 12A is an illustration of a two-dimensional projection 1200 of a road with position of a plurality of vehicles, according to an embodiment. The road in the two-dimensional projection 1200 includes two lanes and is outlined by a first road boundary 1205 and a second road boundary 1210. Beyond each of the road boundaries 1205 and 1210, is an extended, navigable surface of the road, for example a shoulder. The system determines and stores navigable surface boundaries 1240 and 1245. On the illustrated road, are the historical positions of several vehicles and on each vehicle position is a navigable point 1225. Each of the navigable points 1225 may be interpreted as a navigable seed point.

FIG. 12B is an illustration of the of navigable seed points on the two-dimensional projection 1200, according to one embodiment. The two-dimensional projection 1230 represents an update from the projection 1200 in which the visual representation of the vehicles has been removed, such that only the navigable seed points 1225 remain. Around each navigable seed point 1225, the navigable surface module 460 generates a point region 1235 that encompasses a plurality of other points on the two-dimensional projection of the road. The point region 1235 represents a growing region according to an embodiment and is illustrative. The system grows each region until the entire navigable surface is covered. FIG. 12C is a zoomed-in illustration of a point region 1235, according to one embodiment. In the illustrated point region 1235, the navigable seed point 1225 is surrounded by a plurality of neighboring points 1240. The first navigable seed point 1225 is connected to several neighboring navigable points 1240 and each of those connected neighboring points is further connected to several other neighboring navigable points within the point region 1235. Although not shown in the illustrated point region 1235, a point region, for example a point including a navigable seed point on a shoulder, may include a plurality of non-navigable points, resulting in a section of the point region including a non-navigable space. In an embodiment, the online HD map system determines the navigable surface boundaries and stores the information in the HD map. The online HD map system provides the HD map of a geographical region including the navigable surface boundaries to an autonomous vehicle driving through the geographical region. The autonomous vehicle uses the HD map of the geographical region to navigate through the region. The autonomous vehicle may drive off the road over a navigable surface if necessary, for example, in case of an emergency such as a pedestrian or another vehicle suddenly blocking the path of the autonomous vehicle.

Figure 12D:
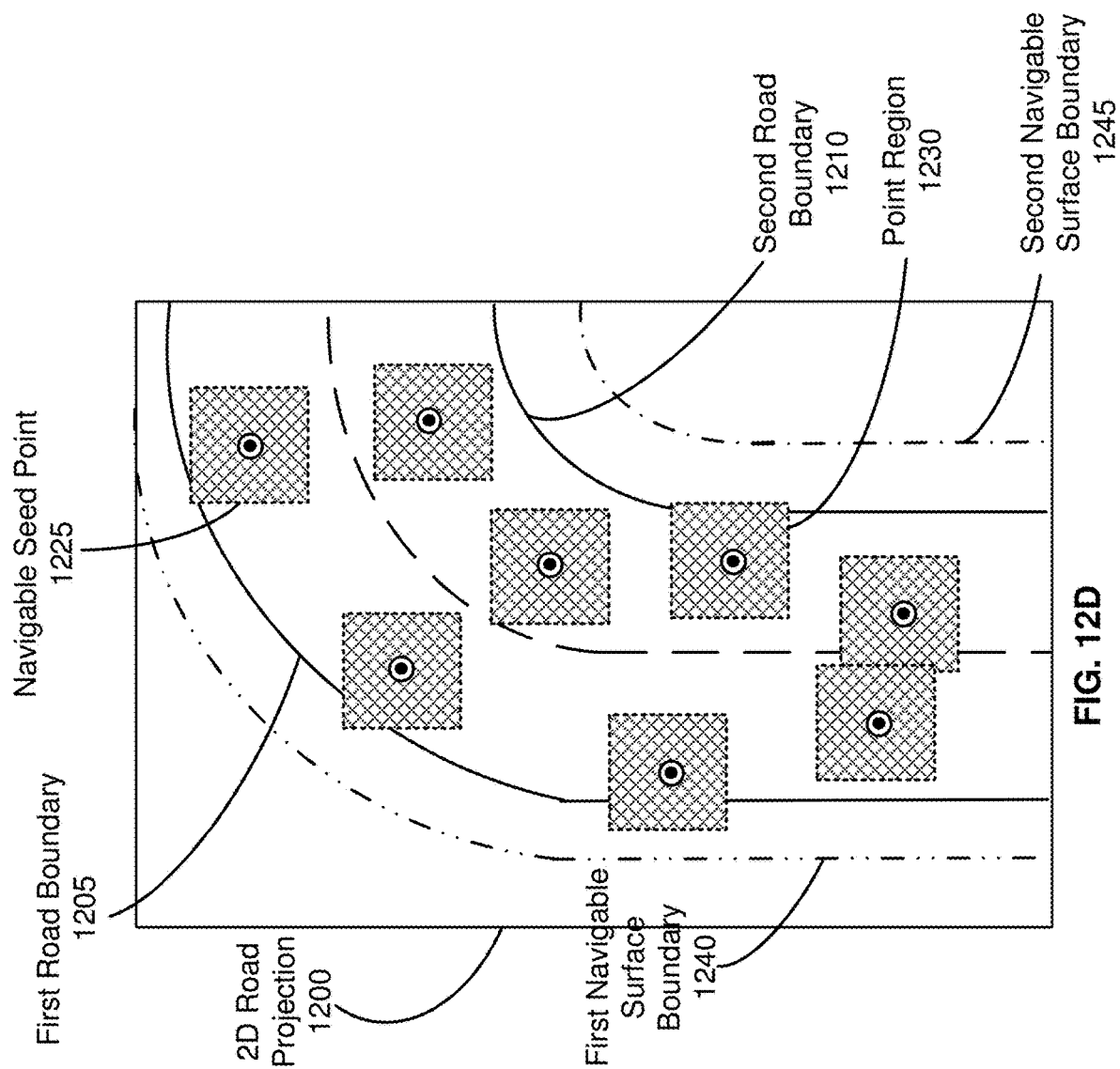
FIGS. 12D-12G are illustration of navigable surfaces and navigable surface boundaries on a two-dimensional projection of the road, according to an embodiment.
Figure 12E:
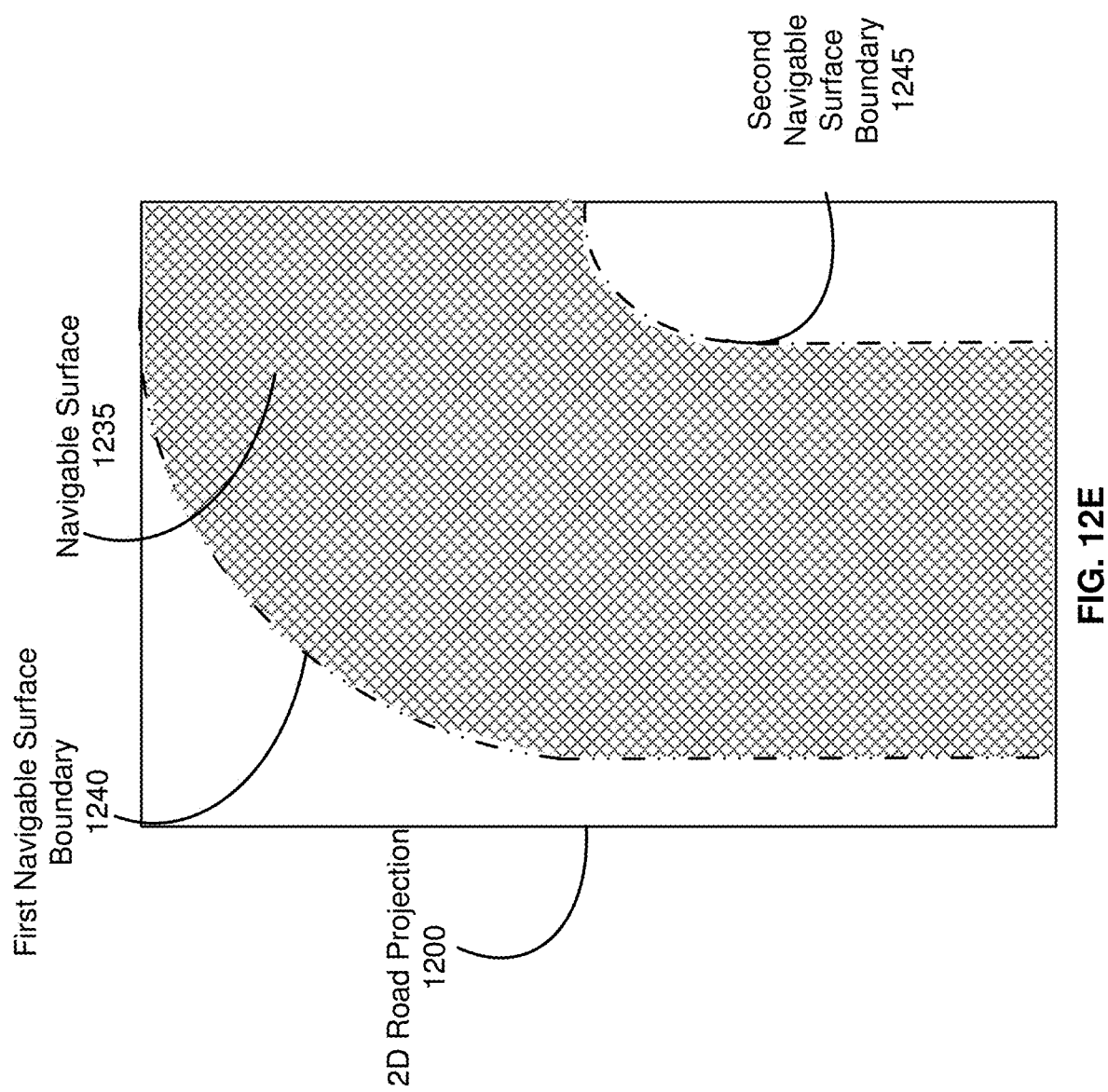
Figure 12F:
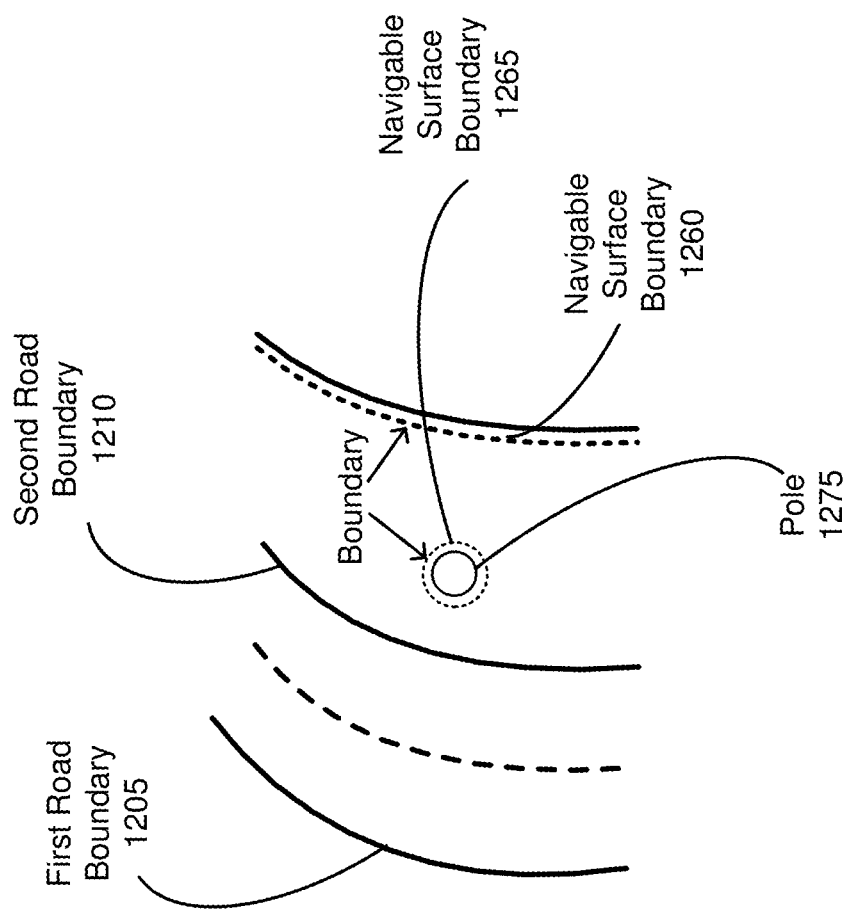
Figure 12G:
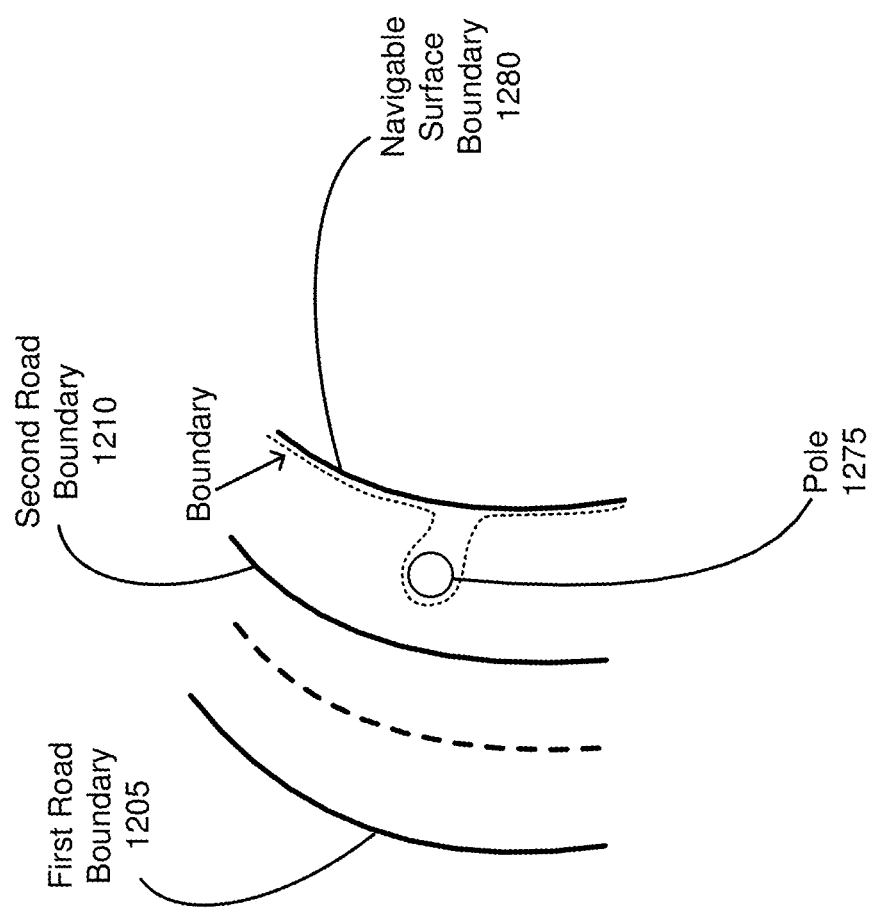

FIG. 12D is an illustration of the two-dimensional projection 1200 in which each navigable points within each point region 1235 have been connected, for example using floodfill techniques, thereby confirming the navigable spaces within each point region. In addition to the illustrated navigable seed points 1230, the projection 1200 includes a plurality of additional navigable seed points and navigable points. Accordingly, when all navigable points and navigable seed points have been connected throughout the projection, the projection 1200 resembles the projection in FIG. 12E. In FIG. 12E, the navigable surface 1245 has been defined within as the entirety of the surface between a first navigable surface boundary (i.e., the first road boundary 1205) and a second navigable surface boundary 1255 (i.e., the second road boundary 1210). As illustrated in FIG. 12E, the navigable surface 1245 represents all surfaces of the road between the first road boundary 1205 and the second road boundary 1210, including the shoulders on either side of the road.

Figure 13:
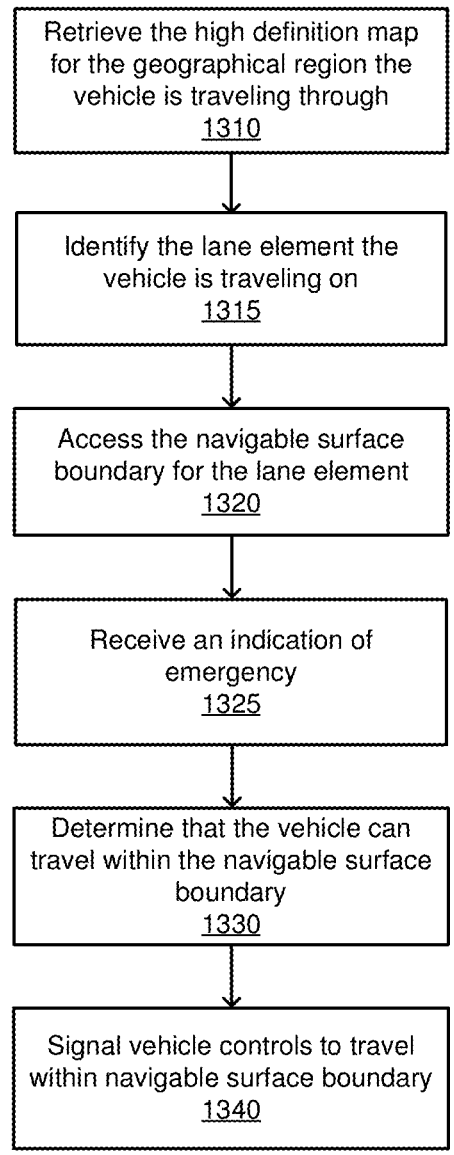
FIG. 13 illustrates a flow chart of the process for navigating a vehicle based on a navigable surface boundary, according to an embodiment.

FIG. 13 illustrates a flow chart of the process for navigating a vehicle based on a navigable surface boundary, according to an embodiment. The lane runtime processing module 280 retrieves 1310 the high definition map for the geographical regions of the high definition map and identifies 1315 the lane element on which the autonomous vehicle is currently traveling. For the identified lane element, the lane runtime processing module 280 accesses 1320 the navigable surface boundary. In the event of an emergency, the lane runtime processing module 280 receives 1325 an indication of an emergency. An emergency refers to an extenuating circumstance that may unexpectedly force the autonomous vehicle out of their lane, for example, another car swerving out of control, large debris blocking the lane, or a hole in the middle of the road. The vehicle detects the emergency by detecting the lane condition via the sensors of the vehicle and analyzing the image, for example, to detect an obstruction within the lane that prevents the lane from continuing to travel in the lane. The vehicle determines if the vehicle could change lane to move to an adjacent lane. If the vehicle determines that the adjacent lane is blocked or if there is no adjacent lane, the vehicle determines whether it is safe to drive on the navigable surface of the lane, if available.

After receiving the indication of emergency, the lane runtime processing module 280 determines 1330, based on the levels of difficulty stored within the points of the polyline, whether the vehicle can safely travel over the navigable surface or the vehicle should continue driving within the lane in spite of an obstruction. For example, the vehicle computing system may accept the risk of driving over an obstruction (e.g., debris) within the road as compared to driving over a navigable surface with very high difficulty of driving or attempting to drive over a surface that is determined to be not navigable (e.g., a cement wall). If it is determined that it is safe for the vehicle to travel over the navigable surface, the lane runtime processing module 280 signals 1340 the vehicle controls of the autonomous vehicle to move out of the current lane and travel within the navigable surface boundary. The vehicle sensors continue to monitor the lane conditions to determine whether it is safe to return to the lane from the navigable surface. If the vehicle computing system 120 determines that the lane conditions are safe, the vehicle computing system 120 sends control signals the to the vehicle controls 130, causing the vehicle to return to the lane associated with the navigable surface boundary. In some embodiments, the lane runtime processing module 280 continuously monitors the levels of difficulty stored within the polylines and compares it with the severity of emergency determined within the lane to determine whether it is safer to return to the lane.

Computing Machine Architecture

Figure 14:
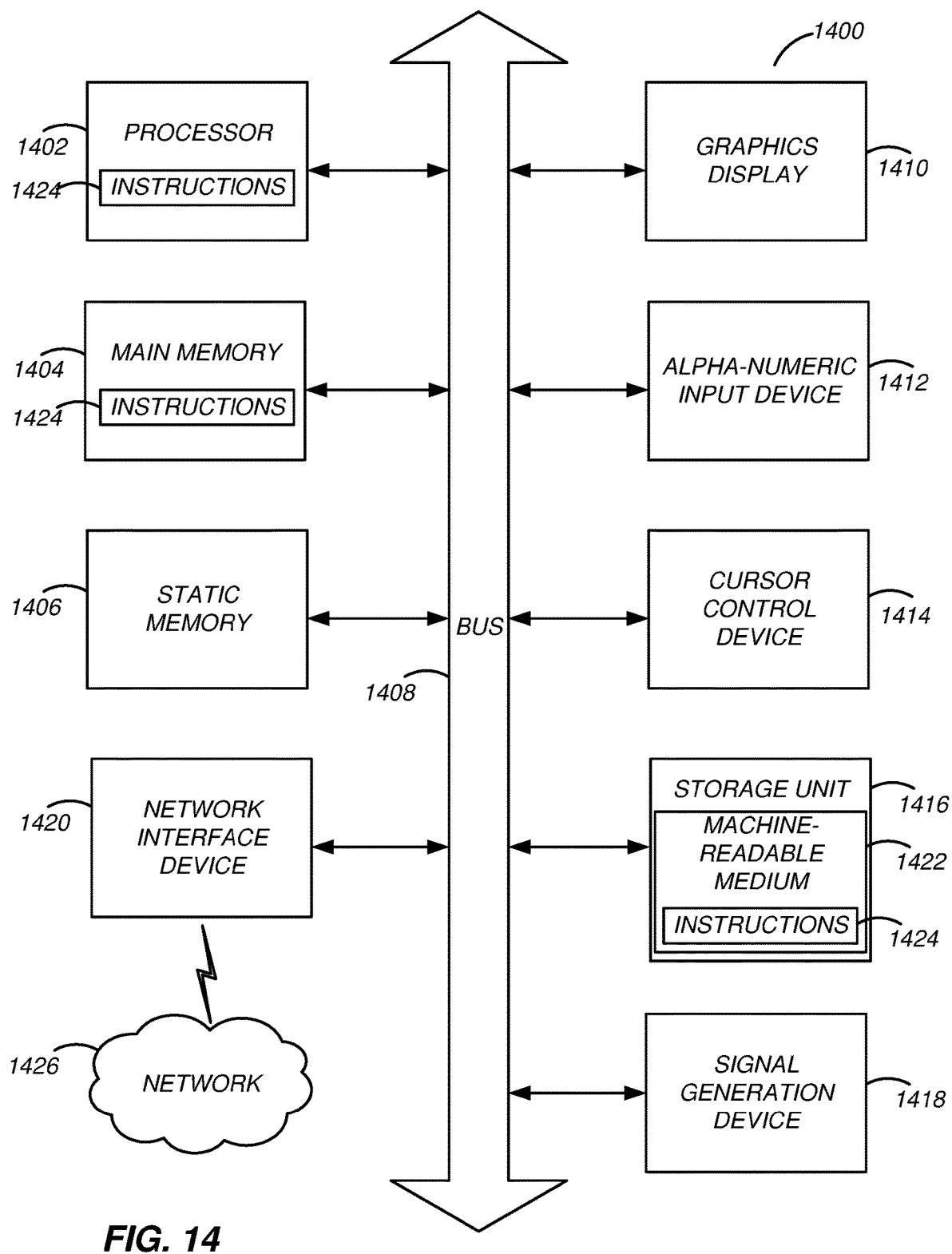
FIG. 14 illustrates an embodiment of a computing machine that can read instructions from a machine-readable medium and execute the instructions in a processor or controller.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. One or more non-transitory computer readable storage media storing instructions that, in response to being executed by one or more processors, cause a system to perform operations, the operations comprising:
    receiving high definition (HD) map data comprising a three-dimensional representation of a road and one or more structures around the road;
    generating a projection of the road from the HD map data comprising a plurality of points along the road and the structures around the road, wherein each point is assigned a navigability score measuring a navigability of the point;
    identifying, based on the navigability score assigned to each point, a plurality of navigable points on the projection of the road;
    determining, based on the plurality of navigable points, a navigable surface boundary corresponding to a physical area that lies outside the road such that a vehicle may safely navigate within the physical area;
    storing updated HD map data of the road overlaid with a projection of the navigable surface boundary; and
    causing a vehicle to perform one or more driving operations based on the navigable surface boundary included in the updated HD map data.

2. The one or more non-transitory computer readable storage media of claim 1, wherein the projection of the road is a grid, each point on the grid mapping two a three-dimensional voxel of the HD map data.

3. The one or more non-transitory computer readable storage media of claim 1, wherein generating a projection of the road from the HD map data comprises:
    for each point on the projection,
        identifying one or more neighboring points within a threshold distance;
        determining a normal vector based on the one or more neighboring points; and
        determining the navigability score assigned to the point based on a difference between the determined normal vector for the point and a height vector of the point.

4. The one or more non-transitory computer readable storage media of claim 1, wherein each navigable point represents a historical position of a vehicle on the road.

5. The one or more non-transitory computer readable storage media of claim 1, wherein identifying the plurality of navigable points on the projection comprises:
accessing a history of traffic navigating along the road of the HD map data, wherein the history of traffic comprises a plurality of vehicles positioned along the road;
aligning each position of a vehicle with the projection of the road; and
identifying, from the accessed history, points on the road over which a vehicle navigated, the identified points labeled as a navigable surface and each remaining point labeled as a non-navigable surface.

6. The one or more non-transitory computer readable storage media of claim 1, wherein determining the navigable surface boundary comprises:
for each navigable point of the plurality of navigable points on the projection,
identifying a plurality of points neighboring the navigable point;
identifying, from the plurality of neighboring points, a first set of navigable points and a second set of non-navigable points;
determining a region of navigable space within the projection of the road based on the first set of navigable points; and
generating a closed contour around the navigable space to define the navigable surface boundary.

7. The one or more non-transitory computer readable storage media of claim 1, wherein the navigable surface boundary is determined based on one or more of the following:
a type of vehicle; or
a height of an object suspended over the road.

8. The one or more non-transitory computer readable storage media of claim 1, wherein the operations further comprise:
mapping each navigable point of the navigable surface boundary on the projection to a three-dimensional node of the HD map data; and
for a first mapped three-dimensional node,
identifying at least a set of neighboring three-dimensional nodes, each neighboring node mapped to a point on the navigable surface boundary in the projection that is connected to the point of the first mapped three-dimensional node;
generating a three-dimensional representation of the navigable surface boundary by connecting the first mapped three-dimensional node with each neighboring three-dimensional node of the set; and
overlaying the HD map data with the three-dimensional representation of the navigable surface boundary to generate the updated HD map data.

9. The one or more non-transitory computer readable storage media of claim 8, wherein the operations further comprise:
determining, for each point of the navigable surface boundary in the projection, a navigability score describing a confidence that the point is navigable;
for each navigable point, assigning the navigability score to a three-dimensional node of the HD map data to which the navigable point is mapped; and
responsive to a navigability score of a neighboring three-dimensional node exceeding a threshold, connecting the neighboring three-dimensional node to a first mapped three-dimensional node to form a section of the navigable surface boundary.

10. The one or more non-transitory computer readable storage media of claim 8, wherein the operations further comprise:
applying one or more filtering techniques to refine regions of the determined navigable surface boundary;
determining, for each point of a navigable surface boundary in the projection, latitude, longitude, and altitude values; and
mapping each point to a three-dimensional node based on the latitude, longitude, and altitude values for the point.

11. The one or more non-transitory computer readable storage media of claim 1, wherein the navigable surface boundary is one of a plurality of navigable surface boundaries, wherein the operations further comprise determining a navigability score for each navigable surface boundaries, the navigability score indicating a level of difficulty of driving on a surface adjacent to the navigable surface boundary.

12. The one or more non-transitory computer readable storage media of claim 11, wherein the plurality of navigable surface boundaries divide a region into a plurality of navigable surfaces, each navigable surface associated with a level of difficulty of driving a vehicle on the navigable surface.

13. A computer implemented method comprising:
a receiving high definition (HD) map data comprising a three-dimensional representation of a road and one or more structures around the road;
generating a projection of the road from the HD map data comprising a plurality of points along the road and the structures around the road, wherein each point is assigned a navigability score measuring a navigability of the point;
identifying, based on the navigability score assigned to each point, a plurality of navigable points on the projection of the road;
determining, based on the plurality of navigable points, a navigable surface boundary corresponding to a physical area that lies outside the road such that a vehicle may safely navigate within the physical area;
storing updated HD map data of the road overlaid with a projection of the navigable surface boundary; and
causing a vehicle to perform one or more driving operations based on the navigable surface boundary included in the updated HD map data.

14. The computer implemented method of claim 13, wherein the projection of the road is a grid, each point on the grid mapping two a three-dimensional voxel of the HD map data.

15. The computer implemented method of claim 13, wherein generating a projection of the road from the HD map data further comprises:
for each point on the projection,
identifying one or more neighboring points within a threshold distance;
determining a normal vector based on the one or more neighboring points; and
determining the navigability score assigned to the point based on a difference between the determined normal vector for the point and a height vector of the point.

16. The computer implemented method of claim 13, wherein each navigable point represents a historical position of a vehicle on the road.

17. The computer implemented method of claim 13, wherein identifying the plurality of navigable points on the projection comprises:

accessing a history of traffic navigating along the road of the HD map data, wherein the history of traffic comprises a plurality of vehicles positioned along the road;

aligning each position of a vehicle with the projection of the road; and identifying, from the accessed history, points on the road over which a vehicle navigated, the identified points labeled as a navigable surface and each remaining point labeled as a non-navigable surface.

18. The computer implemented method of claim 13, wherein determining the navigable surface boundary comprises:

for each navigable point of the plurality of navigable points on the projection,
identifying a plurality of points neighboring the navigable point;
identifying, from the plurality of neighboring points, a first set of navigable points and a second set of non-navigable points;
determining a region of navigable space within the projection of the road based on the first set of navigable points; and
generating a closed contour around the navigable space to define the navigable surface boundary.

19. The computer implemented method of claim 13, wherein the navigable surface boundary is determined based on one or more of the following:
a type of vehicle; or
a height of an object suspended over the road.

20. The computer implemented method of claim 13, further comprising:

mapping each navigable point of the navigable surface boundary on the projection to a three-dimensional node of the HD map data;
for a first mapped three-dimensional node,
identifying at least a set of neighboring three-dimensional nodes, each neighboring node mapped to a point on the navigable surface boundary in the projection that is connected to the point of the first mapped three-dimensional node;
generating a three-dimensional representation of the navigable surface boundary by connecting the first mapped three-dimensional node with each neighboring three-dimensional node of the set; and
overlaying the HD map data with the three-dimensional representation of the navigable surface boundary to generate the updated HD map data.

21. The computer implemented method of claim 20, further comprising:

determining, for each point of the navigable surface boundary in the projection, a navigability score describing a confidence that the point is navigable;
for each navigable point, assigning the navigability score to a three-dimensional node of the HD map data to which the navigable point is mapped; and
responsive to a navigability score of a neighboring three-dimensional node exceeding a threshold, connecting the neighboring three-dimensional node to a first mapped three-dimensional node to form a section of the navigable surface boundary.

22. The computer implemented method of claim 20, further comprising:

applying one or more filtering techniques to refine regions of the determined navigable surface boundary;
determining, for each point of a navigable surface boundary in the projection, latitude, longitude, and altitude values; and mapping each point to a three-dimensional node based on the latitude, longitude, and altitude values for the point.

23. The computer implemented method of claim 13, wherein the navigable surface boundary is one of a plurality of navigable surface boundaries, the method further comprising determining a navigability score for each navigable surface boundaries, the navigability score indicating a level of difficulty of driving on a surface adjacent to the navigable surface boundary.

24. The computer implemented method of claim 23, wherein the plurality of navigable surface boundaries divide a region into a plurality of navigable surfaces, each navigable surface associated with a level of difficulty of driving a vehicle on the navigable surface.

25. A computer system comprising:

one or more processors to perform operations, the operations; and
one or more non-transitory computer readable storage media storing instructions that, in response to being executed by one or more processors, cause the system to perform operations, the operations comprising:
receiving high definition (HD) map data comprising a three-dimensional representation of a road and one or more structures around the road;
generating a projection of the road from the HD map data comprising a plurality of points along the road and the structures around the road, wherein each point is assigned a navigability score measuring a navigability of the point;
identifying, based on the navigability score assigned to each point, a plurality of navigable points on the projection of the road;
determining, based on the plurality of navigable points, a navigable surface boundary corresponding to a physical area that lies outside the road such that a vehicle may safely navigate within the physical area;
storing updated HD map data of the road overlaid with a projection of the navigable surface boundary; and
causing a vehicle to perform one or more driving operations based on the navigable surface boundary included in the updated HD map data.

26. The computer system of claim 25, wherein the projection of the road is a grid, each point on the grid mapping two a three-dimensional voxel of the HD map data.

27. The computer system of claim 25, wherein generating a projection of the road from the HD map data comprises:

for each point on the projection,
identifying one or more neighboring points within a threshold distance;
determining a normal vector based on the one or more neighboring points; and
determining the navigability score assigned to the point based on a difference between the determined normal vector for the point and a height vector of the point.

28. The computer system of claim 25, wherein each navigable point represents a historical position of a vehicle on the road.

29. The computer system of claim 25, wherein identifying the plurality of navigable points on the projection comprises:

accessing a history of traffic navigating along the road of the HD map, wherein the history of traffic comprises a plurality of vehicles positioned along the road;
aligning each position of a vehicle with the projection of the road; and
identifying, from the accessed history, points on the road over which a vehicle navigated, the identified points labeled as a navigable surface and each remaining point labeled as a non-navigable surface.

30. The computer system of claim 25, wherein determining the navigable surface boundary comprises:
   for each navigable point of the plurality of navigable points on the projection,
      identifying a plurality of points neighboring the navigable point;
      identifying, from the plurality of neighboring points, a first set of navigable points and a second set of non-navigable points;
   determining a region of navigable space within the projection of the road based on the first set of navigable points; and
   generating a closed contour around the navigable space to define the navigable surface boundary.

31. The computer system of claim 25, wherein the navigable surface boundary is determined based on one or more of the following:
   a type of vehicle; or
   a height of an object suspended over the road.

32. The computer system of claim 25, wherein the operations further comprise:
   mapping each navigable point of the navigable surface boundary on the projection to a three-dimensional node of the HD map;
   for a first mapped three-dimensional node,
      identifying at least a set of neighboring three-dimensional nodes, each neighboring node mapped to a point on the navigable surface boundary in the projection that is connected to the point of the first mapped three-dimensional node;
      generating a three-dimensional representation of the navigable surface boundary by connecting the first mapped three-dimensional node with each neighboring three-dimensional node of the set; and
   overlaying the HD map data with the three-dimensional representation of the navigable surface boundary to generate the updated HD map.

33. The computer system of claim 32, wherein the operations further comprise:
   determining, for each point of the navigable surface boundary in the projection, a navigability score describing a confidence that the point is navigable;
   for each navigable point, assigning the navigability score to a three-dimensional node of the HD map data to which the navigable point is mapped; and
   responsive to a navigability score of a neighboring three-dimensional node exceeding a threshold, connecting the neighboring three-dimensional node to a first mapped three-dimensional node to form a section of the navigable surface boundary.

34. The computer system of claim 32, wherein the operations further comprise:
   applying one or more filtering techniques to refine regions of the determined navigable surface boundary;
   determining, for each point of a navigable surface boundary in the projection, latitude, longitude, and altitude values; and
   mapping each point to a three-dimensional node based on the latitude, longitude, and altitude values for the point.

35. The computer system of claim 25, wherein the navigable surface boundary is one of a plurality of navigable surface boundaries, wherein the operations further comprise determining a navigability score for each navigable surface boundaries, the navigability score indicating a level of difficulty of driving on a surface adjacent to the navigable surface boundary.

36. The computer system of claim 35, wherein the plurality of navigable surface boundaries divide a region into a plurality of navigable surfaces, each navigable surface associated with a level of difficulty of driving a vehicle on the navigable surface.

\* \* \* \* \*